United States Patent
Jinta et al.

(10) Patent No.: US 12,236,909 B2
(45) Date of Patent: Feb. 25, 2025

(54) DRIVE CIRCUIT OF DISPLAY PANEL, DISPLAY DEVICE, AND DRIVE METHOD OF DISPLAY PANEL

(71) Applicant: SONY SEMICONDUCTOR SOLUTIONS CORPORATION, Kanagawa (JP)

(72) Inventors: Seiichiro Jinta, Kanagawa (JP); Takuya Naruta, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 18/553,536

(22) PCT Filed: Feb. 22, 2022

(86) PCT No.: PCT/JP2022/007071
§ 371 (c)(1),
(2) Date: Sep. 29, 2023

(87) PCT Pub. No.: WO2022/219927
PCT Pub. Date: Oct. 20, 2022

(65) Prior Publication Data
US 2024/0194157 A1 Jun. 13, 2024

(30) Foreign Application Priority Data
Apr. 16, 2021 (JP) .................. 2021-069820

(51) Int. Cl.
G09G 3/36 (2006.01)
G03B 21/00 (2006.01)
G03B 21/20 (2006.01)

(52) U.S. Cl.
CPC ............. *G09G 3/36* (2013.01); *G03B 21/006* (2013.01); *G03B 21/2073* (2013.01);
(Continued)

(58) Field of Classification Search
None
See application file for complete search history.

(56) References Cited

U.S. PATENT DOCUMENTS 5,206,749 A * 4/1993 Zavracky ............ H01L 27/0688
349/158
2009/0273724 A1* 11/2009 Kawahara ............ G09G 3/3611
349/33

FOREIGN PATENT DOCUMENTS

CN 102890904 A 1/2013
JP 2001-202066 A 7/2001
(Continued)

OTHER PUBLICATIONS

International Search Report and Written Opinion of PCT Application No. PCT/JP2022/007071, issued on May 17, 2022, 11 pages of ISRWO.

*Primary Examiner* — Brian M Butcher
(74) *Attorney, Agent, or Firm* — CHIP LAW GROUP

(57) ABSTRACT

There are provided a drive circuit of a display panel, a display device, and a control method of a display device which can suppress deterioration of display characteristics. A drive circuit of a display panel is a drive circuit of a display panel having a liquid crystal layer of which molecular characteristics are changed according to a potential difference between a first electrode and a second electrode, and includes a signal processing unit that outputs a first signal for changing the potential difference according to an input pixel signal, and a control unit that causes the signal processing unit to output a second signal for changing the potential difference at a predetermined cycle.

15 Claims, 39 Drawing Sheets

(52) U.S. Cl.
CPC ... *G09G 3/3614* (2013.01); *G09G 2320/0233* (2013.01); *G09G 2320/046* (2013.01)

(56) References Cited

FOREIGN PATENT DOCUMENTS

| | | |
|---|---|---|
| JP | 2002-196735 A | 7/2002 |
| JP | 2007-206679 A | 8/2007 |
| JP | 2008-282936 A | 11/2008 |
| JP | 2010-266602 A | 11/2010 |
| JP | 2019-028242 A | 2/2019 |
| JP | 2020-016681 A | 1/2020 |
| WO | 2013/140626 A1 | 9/2013 |

* cited by examiner

GRAY DISPLAY

WHITE DISPLAY

■ EXAMPLE OF DISPLAY PATTERN OF EACH PIXEL

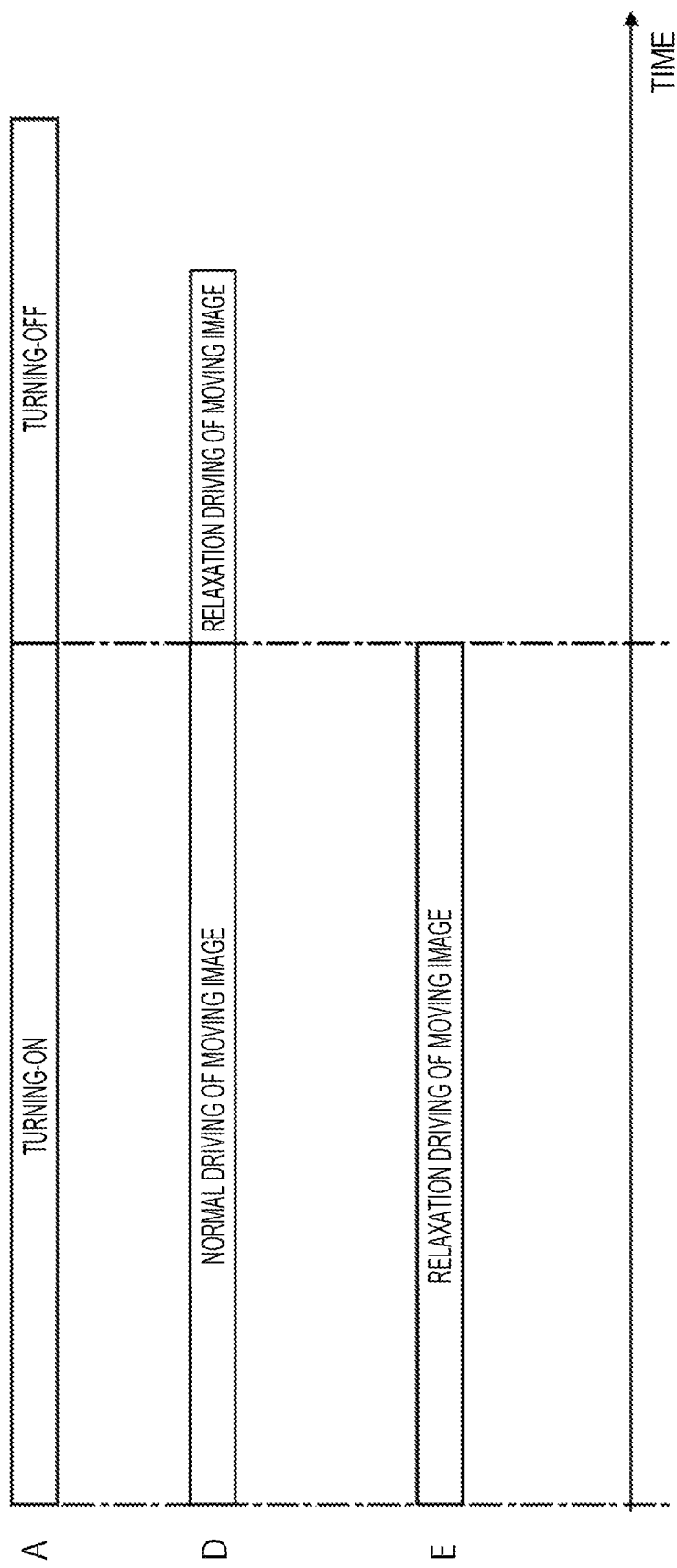

FIG. 30
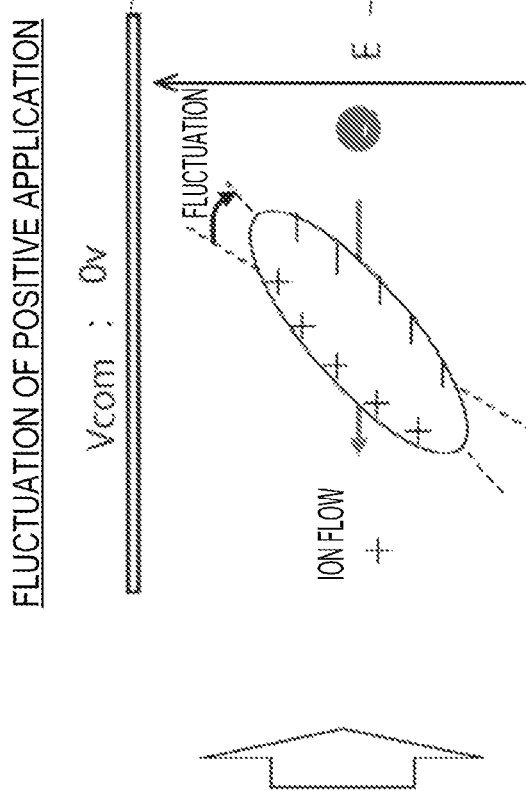
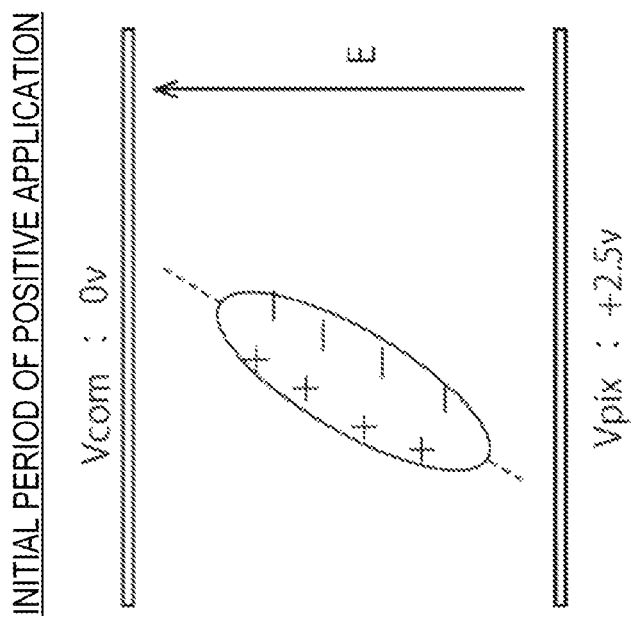

FIG. 34
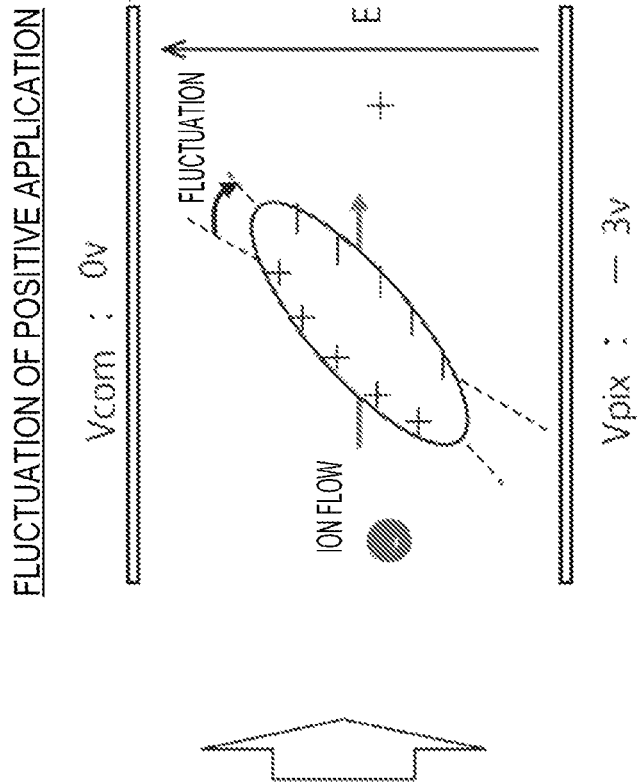
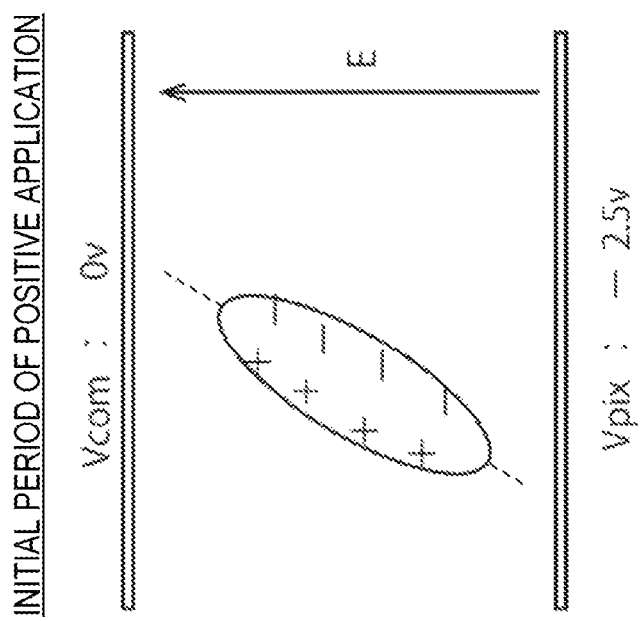

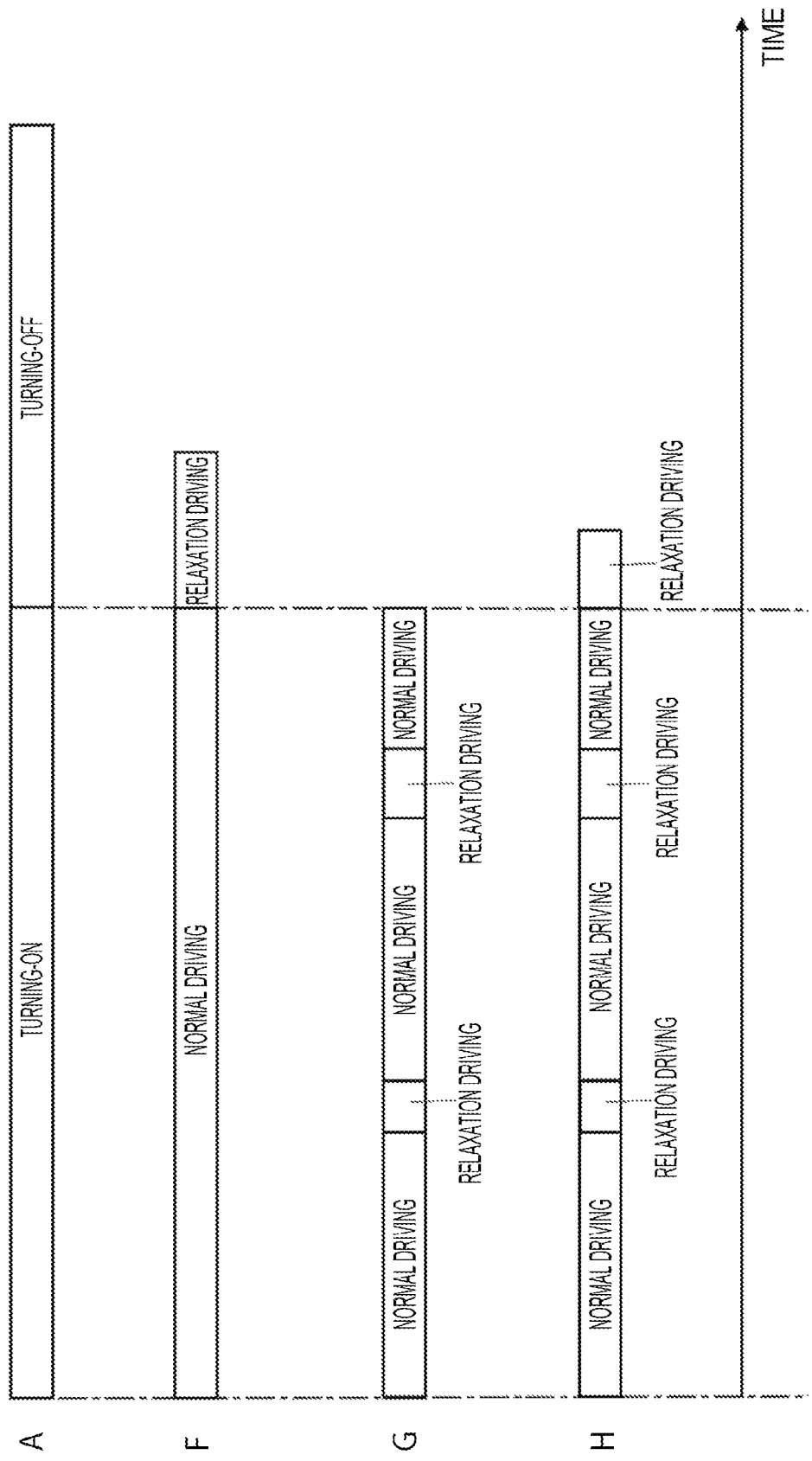

FIG. 38
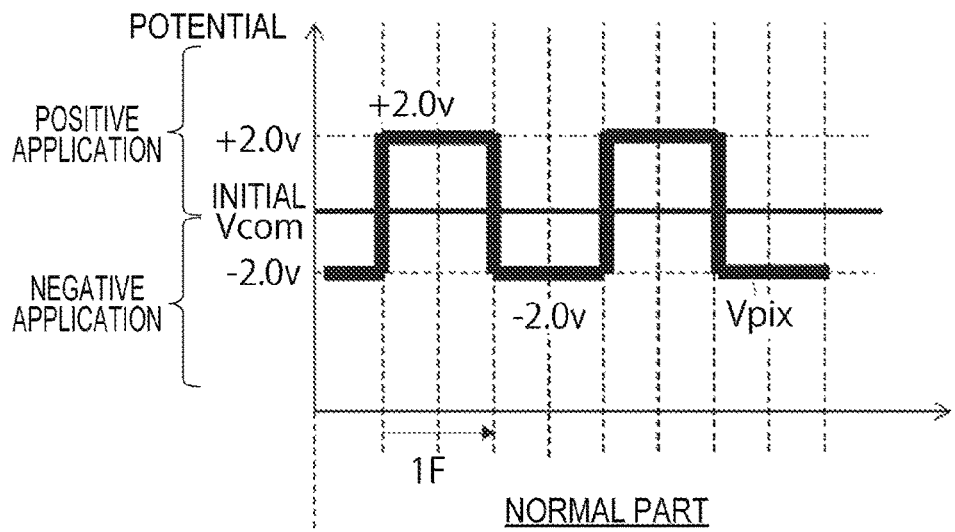
NORMAL PART
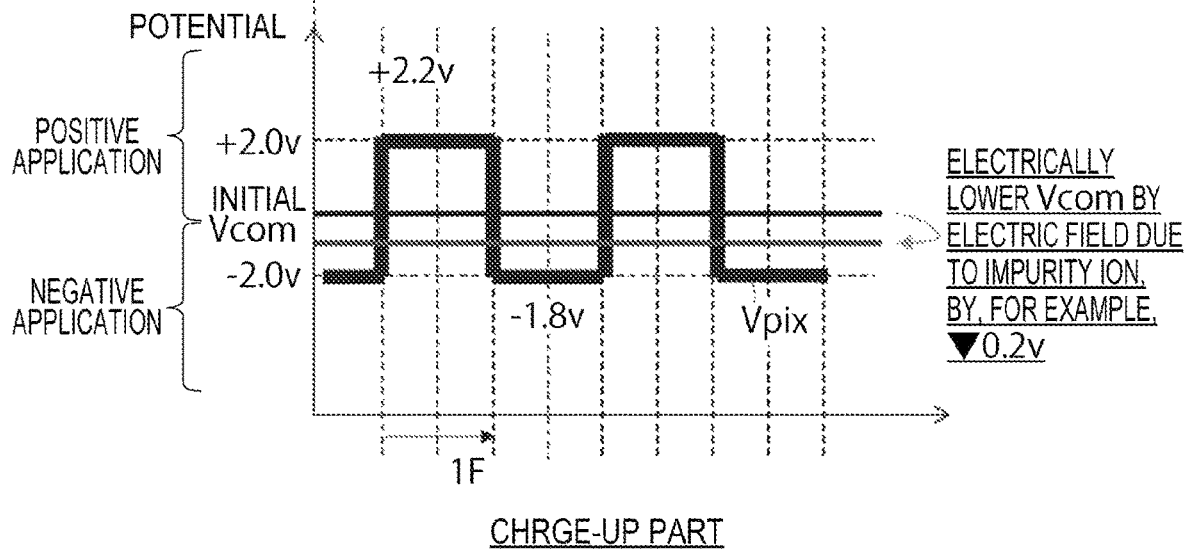
CHRGE-UP PART

FIG. 41
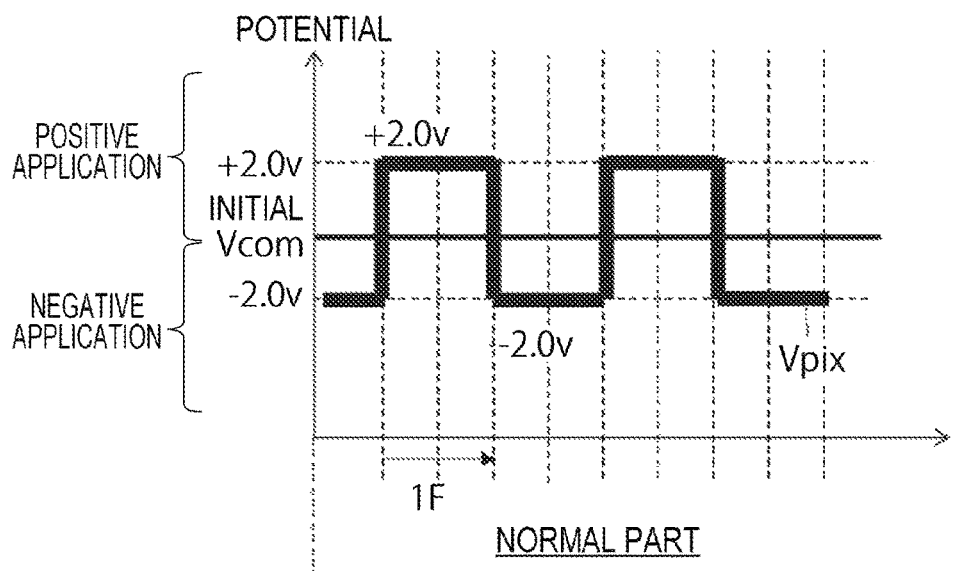
NORMAL PART
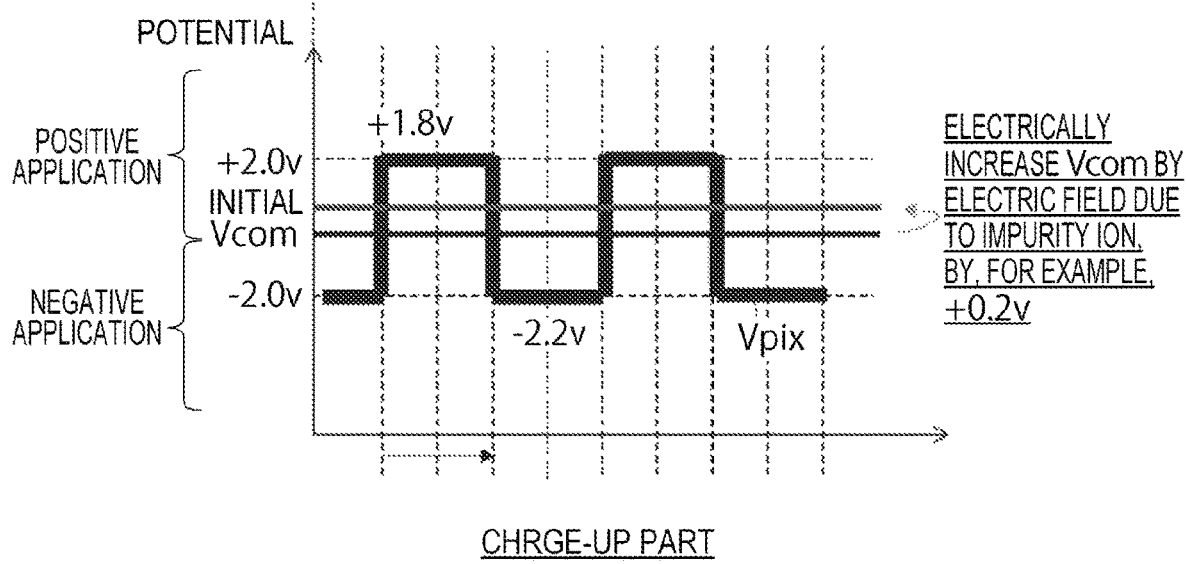
CHRGE-UP PART

DRIVE CIRCUIT OF DISPLAY PANEL, DISPLAY DEVICE, AND DRIVE METHOD OF DISPLAY PANEL

CROSS REFERENCE TO RELATED APPLICATIONS

This application is a U.S. National Phase of International Patent Application No. PCT/JP2022/007071 filed on Feb. 22, 2022, which claims priority benefit of Japanese Patent Application No. JP 2021-069820 filed in the Japan Patent Office on Apr. 16, 2021. Each of the above-referenced applications is hereby incorporated herein by reference in its entirety.

TECHNICAL FIELD

The present disclosure relates to a drive circuit of a display panel, a display device, and a drive method of a display panel.

BACKGROUND ART

As a display device for displaying an image, for example, a display device which has high transmittance and to which a liquid crystal display panel is applied is known. In such a display device, it is necessary to apply a relatively high voltage to a pixel when an image is displayed.

Therefore, ionic impurities in the liquid crystal display panel are diffused and aggregated in a pixel region by subsequent driving of the display device, thereby causing deterioration of display characteristics of the liquid crystal panel.

CITATION LIST

Patent Document

Patent Document 1: Japanese Patent Application Laid-Open No. 2020-16681
Patent Document 2: Japanese Patent Application Laid-Open No. 2007-206679

SUMMARY OF THE INVENTION

Problems to be Solved by the Invention

Therefore, the present disclosure provides a drive circuit of a display panel, a display device, and a drive method of a display panel which can suppress deterioration of display characteristics.

Solutions to Problems

In order to solve the problem described above, according to the present disclosure, there is provided a drive circuit of a display panel having a liquid crystal layer of which molecular characteristics are changed according to a potential difference between a first electrode and a second electrode, the drive circuit including: a signal processing unit that outputs a first signal for changing the potential difference according to an input pixel signal; and a control unit that outputs, as a second signal, at least one of a signal for changing the potential difference at a predetermined cycle or a signal for maintaining the potential difference in a direction of reducing ions staying between the first electrode and the second electrode, for a predetermined time.

The control unit may perform control to cause the signal processing unit to output the second signal in a predetermined period after the first signal is output.

The control unit may perform control to cause the signal processing unit to output the second signal which periodically generates a predetermined first potential difference and a second potential difference different from the first potential difference.

The signal processing unit may include a first gradation conversion unit that performs conversion into the first signal on the basis of a first gradation characteristic, and a second gradation conversion unit that performs conversion into the first signal on the basis of a second gradation characteristic different from the first gradation characteristic, and the control unit may alternately change the first signal based on the first gradation characteristic and the first signal based on the second gradation characteristic at the predetermined cycle, and output the signal as the second signal.

The signal processing unit may further include a third gradation conversion unit that performs conversion into the first signal on the basis of a third gradation characteristic different from the first gradation characteristic and the second gradation characteristic, and a transmittance of the liquid crystal layer according to the first signal based on the third gradation characteristic may be between a transmittance of the liquid crystal layer according to the first signal based on the first gradation characteristic and a transmittance of the liquid crystal layer according to the first signal based on the second gradation characteristic.

The control unit may be configured to cause the signal processing unit to output the first signal based on the third gradation characteristic in a first mode, and alternately change the first signal based on the first gradation characteristic and the first signal based on the second gradation characteristic at the predetermined cycle, and output the signal as the second signal in a second mode.

The control unit may cause the signal processing unit to output the second signal in a turning-off period of light emitted to the liquid crystal layer.

The control unit may alternately output the first signal and the second signal in a turning-on period of light emitted to the liquid crystal layer.

The display panel may have a plurality of pixels having a liquid crystal layer of which molecular characteristics are changed according to the potential difference between the first electrode and the second electrode.

The second electrodes may be formed as common electrode connected to each other, and the potential difference may be different between the pixels.

The control unit may cause the signal processing unit to output the second signal such that the potential difference applied between adjacent pixels is different, and is periodically switched.

The drive circuit of the display panel; a light source; a first polarizing plate that firstly polarizes emitted light to irradiate the display panel with the light; and a second polarizing plate that secondly polarizes the light emitted from the display panel may be provided.

The drive circuit of the display panel; a light source; a condensing optical system that guides light emitted from the light source to the display panel; and a projection optical system that magnifies and projects the light modulated by the display panel may be provided.

According to the present disclosure, there is provided a drive method of a display panel having a liquid crystal layer of which molecular characteristics are changed according to a potential difference between a first electrode and a second electrode, the drive method including a first output step of outputting a first signal for changing the potential difference according to an input pixel signal; and a second output step of outputting, as a second signal, at least one of a signal for changing the potential difference at a predetermined cycle or a signal for maintaining the potential difference in a direction of reducing ions staying between the first electrode and the second electrode, for a predetermined time.

BRIEF DESCRIPTION OF DRAWINGS

FIG. 25 is a timing chart of the fourth mode which is relaxation driving in moving image display.

FIG. 30 is a diagram schematically illustrating movement of liquid crystal molecules and a transverse electric field when a pixel signal fluctuates from 2.5 volts to 3 volts.

FIG. 34 is a diagram schematically illustrating movement of molecules of a liquid crystal and a transverse electric field when a pixel signal fluctuates from −2.5 volts to −3 volts.

FIG. 36 is a timing chart of relaxation driving in a third mode of the second embodiment.

FIG. 38 is a diagram illustrating an example in which an absolute value of 2 volts is applied.

FIG. 41 is a diagram illustrating an example in which an absolute value of 2 volts is applied as a potential.

MODE FOR CARRYING OUT THE INVENTION

Hereinafter, embodiments of a drive circuit of a display panel, a display device, and a drive method of a display panel will be described with reference to the drawings. Although main components of a drive circuit of a display panel, a display device, and a drive method of a display panel will be mainly described below, the drive circuit of the display panel, the display device, and the drive method of the display panel may have components or functions that are not illustrated or described. The following description does not exclude configuration parts and functions that are not illustrated or described.

First Embodiment

Figure 1:
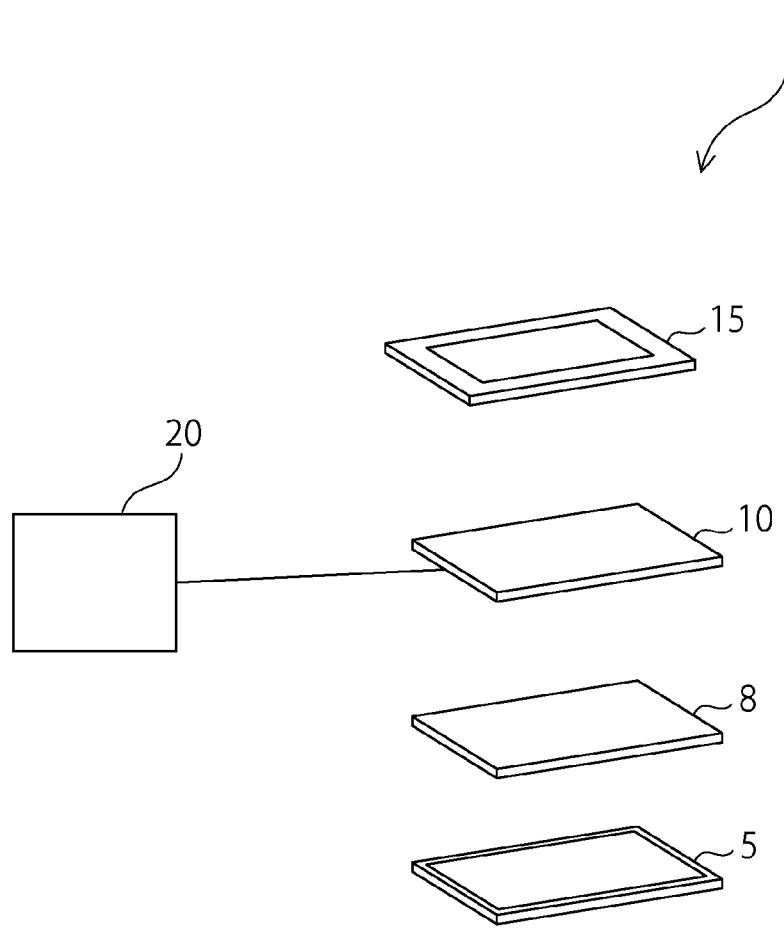
FIG. 1 is a schematic diagram illustrating a schematic configuration of a liquid crystal display device in an embodiment.

FIG. 1 is a schematic diagram illustrating a schematic configuration of a liquid crystal display device 1 in the present embodiment. In the present embodiment, the display device 1 is, for example, an active matrix-type liquid crystal display device.

As illustrated in FIG. 1, the display device 1 includes a backlight 5, a polarizing plate 8, a liquid crystal display panel 10, a front cover 15, and a drive circuit 20. The backlight 5, the polarizing plate 8, the liquid crystal display panel 10, and the front cover 15 are arranged in order from a back surface side toward a display surface side. The backlight 5 is, for example, a light source, and irradiates an effective pixel region of the liquid crystal display panel 10 with light.

The polarizing plate 8 includes a first polarizing plate formed on a transparent plate. The liquid crystal display panel 10 displays an image based on the pixel signal supplied from the drive circuit 20. Note that the liquid crystal display panel 10 may be either a black-and-white display panel or a color display panel. Furthermore, details of the liquid crystal display panel 10 will be described later. Furthermore, the pixel signal may be referred to as a video signal.

The front cover 15 is a transparent cover that covers the liquid crystal display panel 10, and includes a second polarizing plate whose polarization direction is orthogonal to that of the first polarizing plate. The drive circuit 20 processes the pixel signal, and supplies the processed pixel signal to the liquid crystal display panel 10. Note that details of the drive circuit 20 will also be described later.

Detailed configuration examples of the liquid crystal display panel 10 and the drive circuit 20 will be described with reference to FIGS. 2, 3, 4A, 4B, and 4C.

Figure 2:
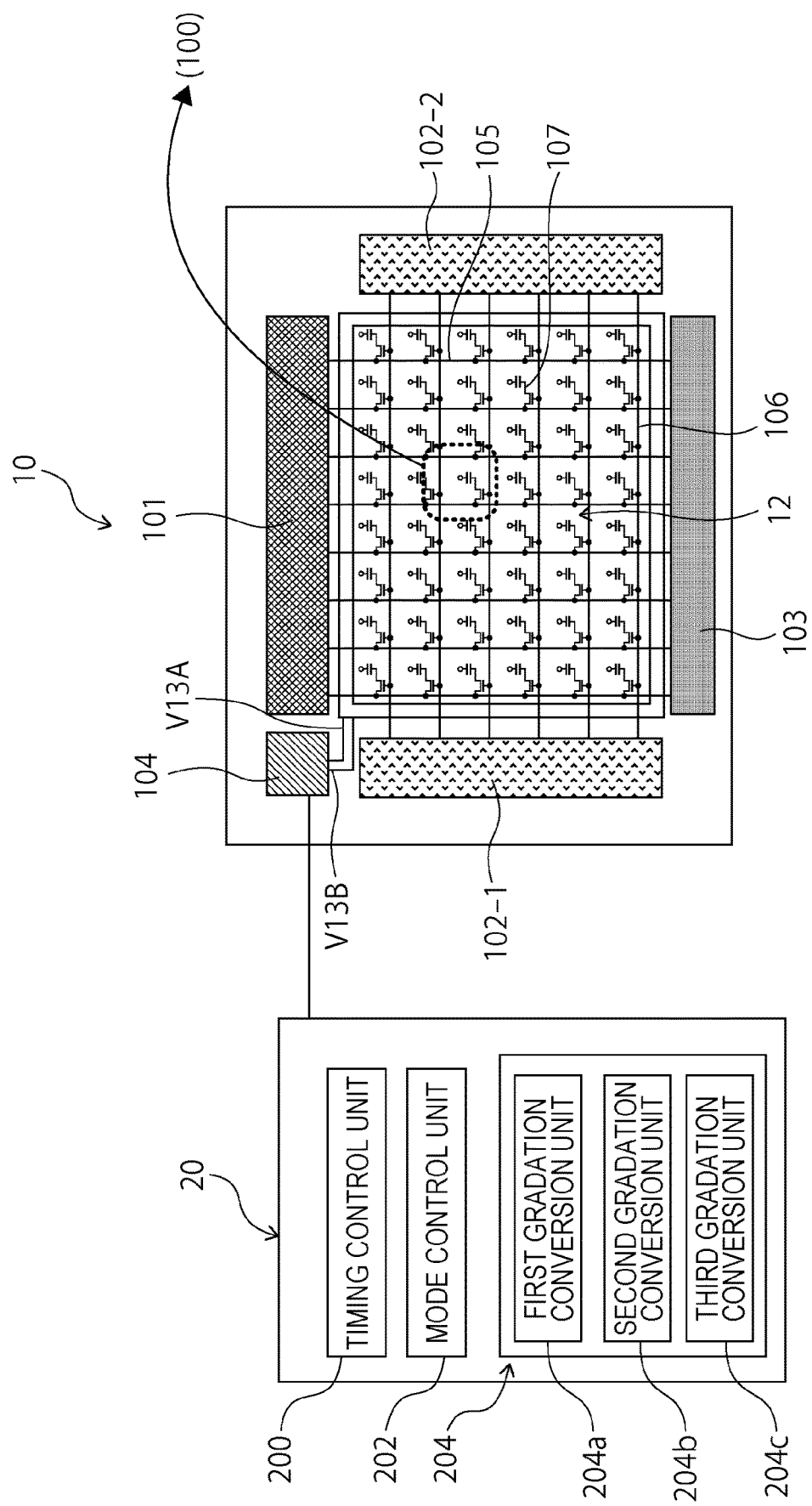
FIG. 2 is a diagram illustrating a detailed configuration example of a liquid crystal display panel and a drive circuit.
Figure 3:
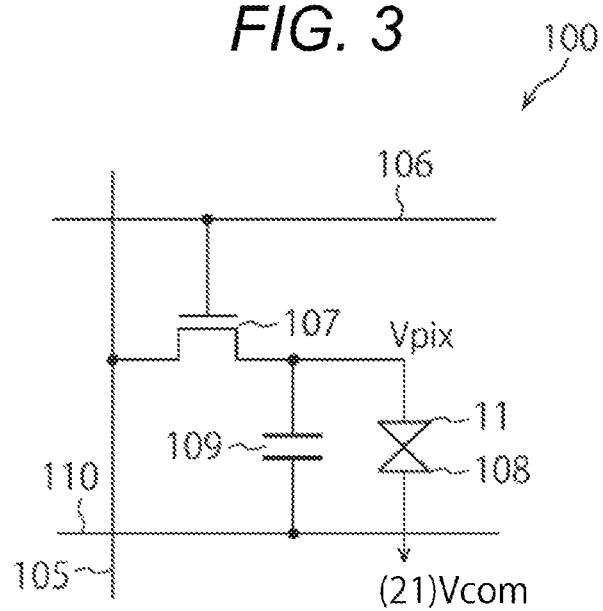
FIG. 3 is a diagram illustrating a configuration example of a pixel.

FIG. 2 is a diagram illustrating a detailed configuration example of the liquid crystal display panel 10 and the drive circuit 20. FIG. 3 is a diagram illustrating a configuration example of a pixel 100.

Figure 4A:
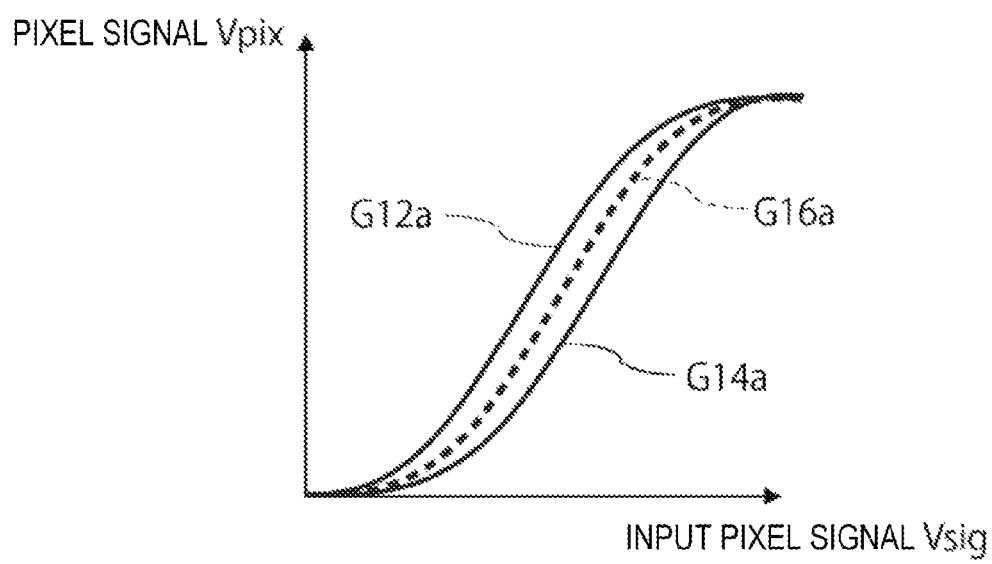
FIG. 4A is a diagram illustrating an example of a gradation curve of a gradation conversion unit in a drive circuit.
Figure 4B:
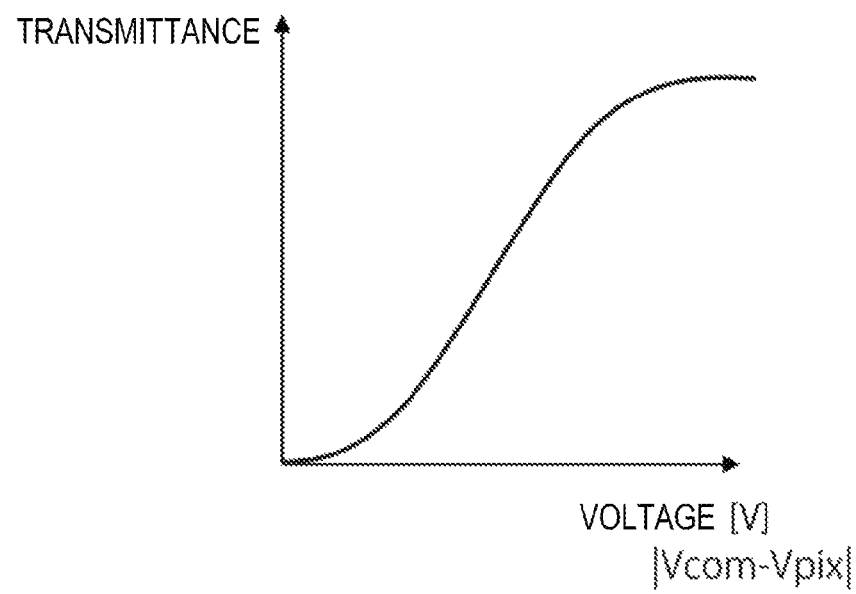
FIG. 4B is a diagram illustrating a relationship between a pixel signal and transmittance of a liquid crystal.
Figure 4C:
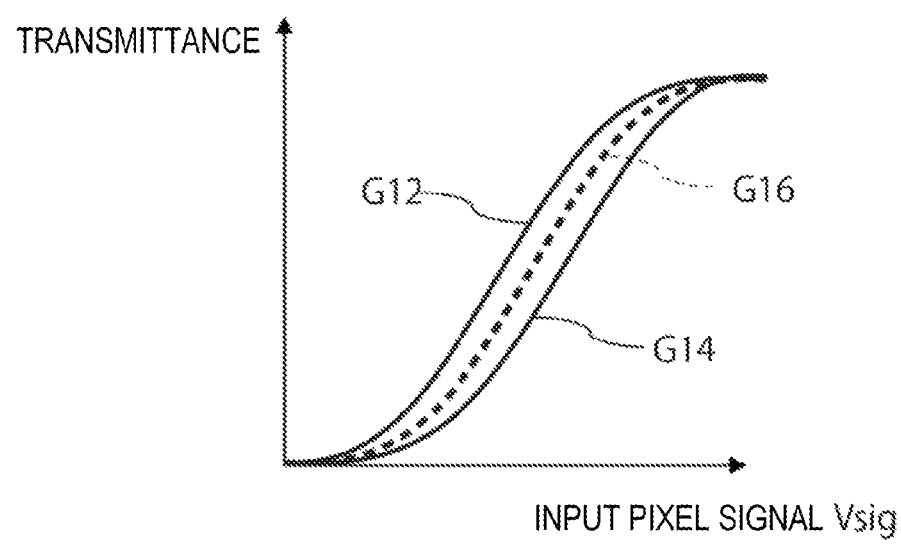
FIG. 4C is a diagram illustrating a relationship between an input pixel signal and transmittance of a liquid crystal.

FIG. 4A is a diagram illustrating an example of a gradation curve of a gradation conversion unit 204 in the drive circuit 20. The horizontal axis represents an input pixel signal Vsig, and the vertical axis represents a pixel signal Vpix. FIG. 4B is a diagram illustrating a relationship between the pixel signal Vpix and the transmittance of a liquid crystal 108. The horizontal axis represents an absolute value of the difference between the pixel signal Vpix and a common potential Vcom, and the vertical axis represents the transmittance. FIG. 4C is a diagram illustrating a relationship between the input pixel signal Vsig and the transmittance of the liquid crystal 108. The horizontal axis represents the input pixel signal Vsig, and the vertical axis represents the transmittance. Note that the liquid crystal 108 according to the present embodiment corresponds to a liquid crystal layer.

As illustrated in FIG. 2, the liquid crystal display panel 10 includes an effective pixel region 12 in which pixels 100 are arranged in an array, a horizontal transfer circuit 101, vertical transfer circuits 102-1 and 102-2, a precharge circuit 103, and a voltage control circuit 104. In the effective pixel region 12, a plurality of data lines 105 and a plurality of scanning lines (gate wiring) 106 are wired in a lattice shape, one end side of each data line 105 is connected to the horizontal transfer circuit 101, the other end side of each data line 105 is connected to the precharge circuit 103, and end portions of each scanning line 106 are connected to the vertical transfer circuits 102-1 and 102-2.

As illustrated in FIG. 3, in a plurality of pixels 100 which is formed in a matrix shape and constitute the effective pixel region 12, a pixel switching thin film transistor (TFT) 107 that performs switching control, the liquid crystal 108, and an auxiliary capacitance 109 are provided. The data line 105 is electrically connected to the source of the transistor 107, and supplies the pixel signal Vpix to be written. Furthermore, the scanning line 106 is electrically connected to the gate of the transistor 107, and a scanning signal is applied to the scanning line 106 in a pulsed manner at a predetermined timing.

The drive circuit 20 includes a timing control unit 200, a mode control unit 202, and the gradation conversion unit 204. Moreover, the gradation conversion unit 204 includes a first gradation conversion unit 204a, a second gradation conversion unit 204b, and a third gradation conversion unit 204c. Note that the mode control unit 202 according to the present embodiment corresponds to a control unit, and the gradation conversion unit 204 corresponds to a signal processing unit.

The timing control unit 200 generates a synchronization signal. The liquid crystal display panel 10 is controlled according to the synchronization signal. Furthermore, the timing control unit 200 can output a mode selection signal.

The mode control unit 202 has a first mode in which normal driving is performed according to the mode selection signal, and a second mode in which relaxation driving is performed. That is, the first mode is a normal mode in which normal display is performed, and the second mode is a relaxation mode in which burn-in relaxation is performed. Furthermore, the relaxation mode has a third mode and a fourth mode. The third mode is a mode in which relaxation driving is performed in a case of still image display. The fourth mode is a mode in which relaxation driving is performed in a case of a moving image. Details of each mode will be described later.

The gradation conversion unit 204 converts the input pixel signal Vsig into the pixel signal Vpix. As illustrated in FIG. 4A, the first gradation conversion unit 204a converts the input pixel signal Vsig into the pixel signal Vpix according to a first gradation curve G12a. Furthermore, the second gradation conversion unit 204b converts the input pixel signal Vsig into the pixel signal Vpix according to a second gradation curve G14a. Furthermore, the third gradation conversion unit 204c converts the input pixel signal Vsig into the pixel signal Vpix according to a third gradation curve G16a. Note that in the present embodiment, a signal output according to the first gradation curve G12a, the second gradation curve G14a, and the third gradation curve G16a is referred to as a first signal. In this case, a case where the first gradation curve G12a, the second gradation curve G14a, and the third gradation curve G16a are, for example, linear is also referred to as the first signal. Furthermore, a signal output from the gradation conversion unit 204 in the relaxation driving is referred to as a second signal.

As illustrated in FIG. 4B, the transmittance of the liquid crystal 108 is changed according to the absolute value of the difference between the pixel signal Vpix and the common potential Vcom. For example, the transmittance of the liquid crystal 108 is changed according to the characteristics of the sigmoid curve according to the absolute value of the difference between the pixel signal Vpix and the common potential Vcom.

As illustrated in FIG. 4C, a first gradation curve G12 corresponds to the first gradation curve G12a, a second gradation curve G14 corresponds to the second gradation curve G14a, and a third gradation curve G16 corresponds to the third gradation curve G16a. That is, since the magnitudes of pixel signals Vpix converted according to the first gradation curve G12a, the second gradation curve G14a, and the third gradation curve G16a are different for the input pixel signal Vsig, the transmittance of the liquid crystal 108 is different for each of the gradation curves G12, G14, and G16 for the same input pixel signal Vsig. In the present embodiment, each of the first gradation curve G12a, the second gradation curve G14a, and the third gradation curve G16a is formed such that the average value of the transmittance of the first gradation curve G12 and the transmittance of the second gradation curve G14 for the same input pixel signal Vsig is equal to the transmittance of the third gradation curve G16.

As illustrated in FIG. 3 again, a pixel electrode 11 is electrically connected to the drain of the transistor 107, and by turning on the switch of the transistor 107, which is a switching element, only for a certain period, the pixel signal Vpix supplied from the data line 105 is written into the liquid crystal 108 at a predetermined timing. Note that the pixel signal Vpix is a voltage signal.

The pixel signal Vpix at a predetermined level written in the liquid crystal 108 via the pixel electrode 11 is held for a certain period with a common electrode (counter electrode) 21 (refer to FIG. 6) formed on a counter substrate. The common potential Vcom is applied to the common electrode 21 (refer to FIG. 6).

The liquid crystal 108 modulates light to enable gradation display by changing the alignment and order of molecular assemblies depending on the applied voltage level. Incident light can pass through a liquid crystal portion according to the voltage of the applied pixel signal Vpix, and light having a contrast according to the pixel signal Vpix as a whole is emitted from the liquid crystal display element. Here, in order to prevent the held pixel signal Vpix from leaking, the auxiliary capacitance 109 is added in parallel with a liquid crystal capacitance formed between the pixel electrode 11 and the counter electrode 21 (refer to FIG. 6). Therefore, the holding characteristics are further improved, and a liquid crystal display element having a high contrast ratio can be realized. Furthermore, in order to form such a holding capacitance 109, a common wiring 110 made resistive is provided. The common potential Vcom is applied to the common wiring 110. The liquid crystal display device 1 of the present embodiment is configured as, for example, an active matrix-type liquid crystal display element that performs frame inversion driving in which the voltage of the pixel signal Vpix applied to each pixel electrode 11 is inverted with respect to the common potential Vcom that is a counter electrode voltage, for each frame.

Figure 5:
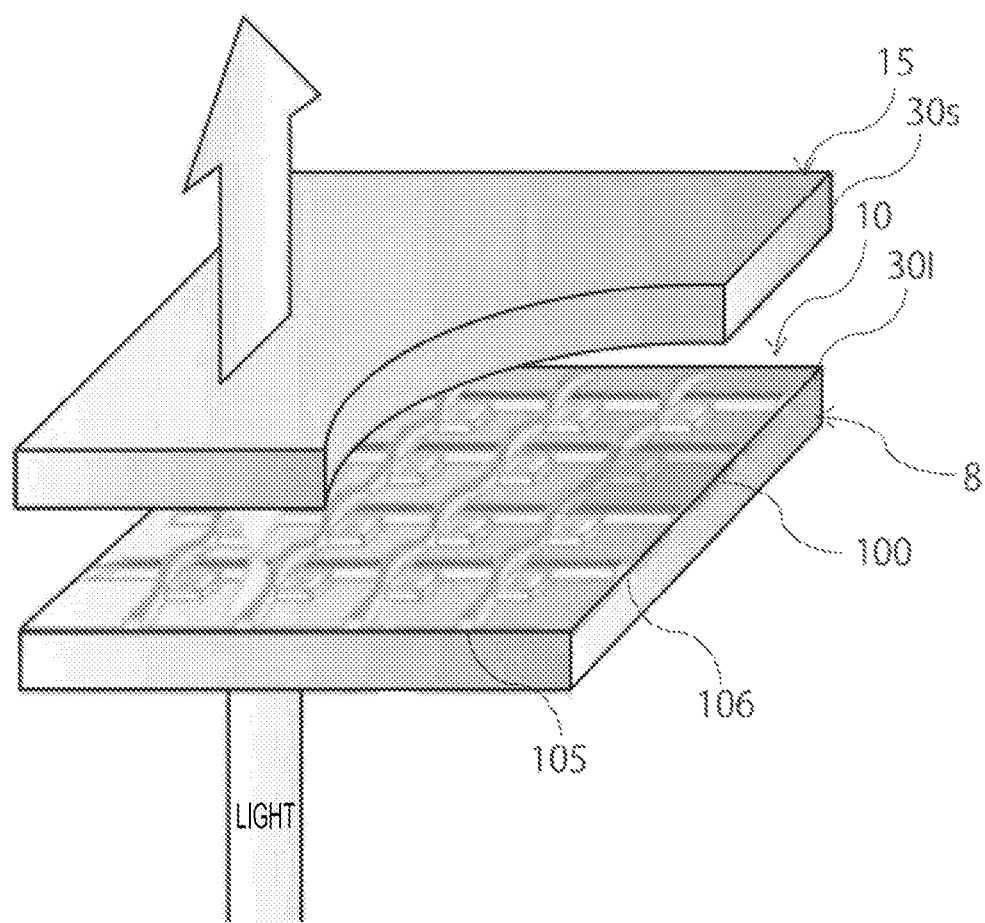
FIG. 5 is a diagram schematically illustrating a lamination example of a polarizing plate, a liquid crystal display panel, and a front cover.
Figure 6:
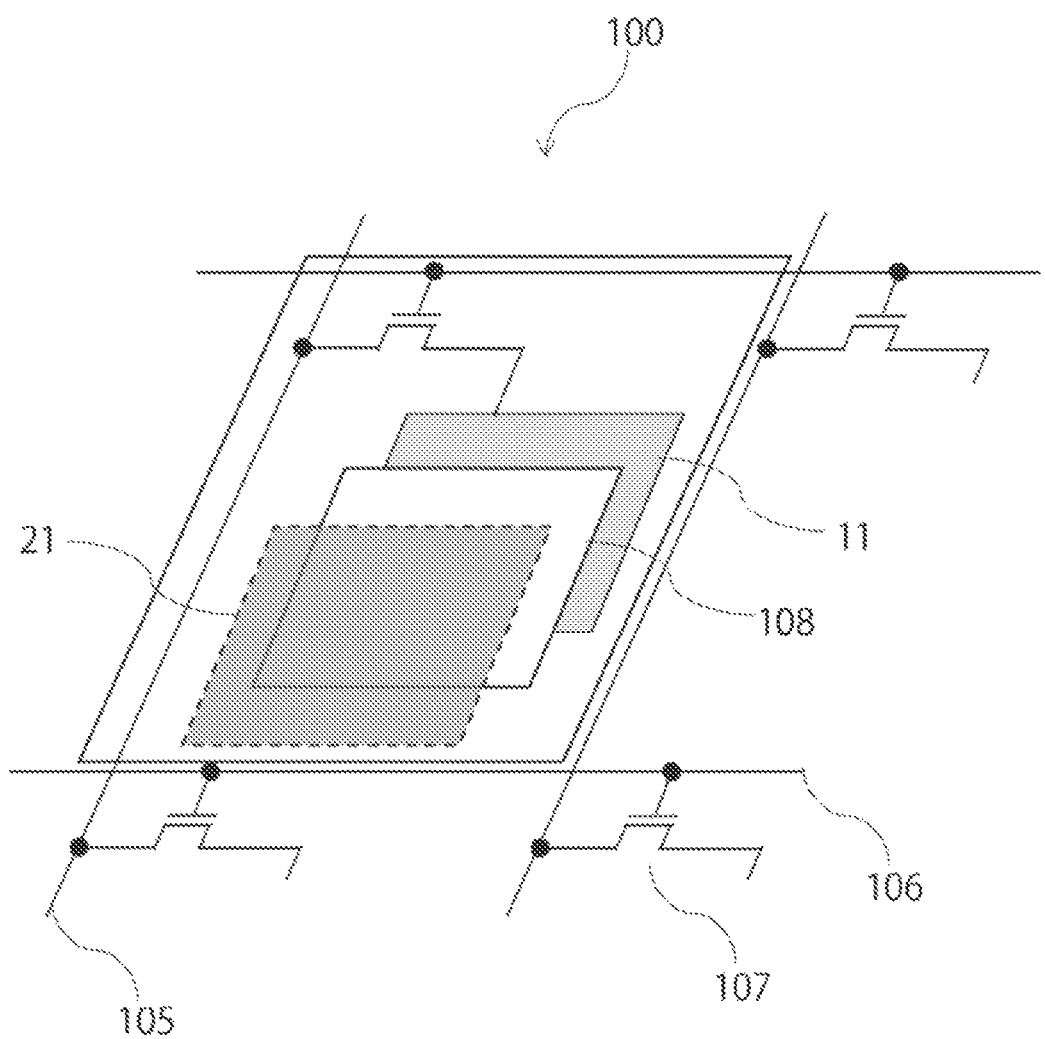
FIG. 6 is a diagram schematically illustrating the pixel of FIG. 5.

FIG. 5 is a diagram schematically illustrating a lamination example of the polarizing plate 8, the liquid crystal display panel 10, and the front cover 15. FIG. 6 is a diagram schematically illustrating the pixel 100 of FIG. 5. As illustrated in FIG. 5, the liquid crystal display panel 10 is irradiated with light of the backlight through a first polarizing plate 301 of the polarizing plate 8. Then, the light transmitted through the liquid crystal display panel 10 is displayed through a second polarizing plate 30s of the front cover 15. In this case, the transmittance of the liquid crystal 108 is controlled by the absolute value of a potential difference V=(Vpix−Vcom) between the pixel electrode 11 and the counter electrode 21.

Figure 7A:
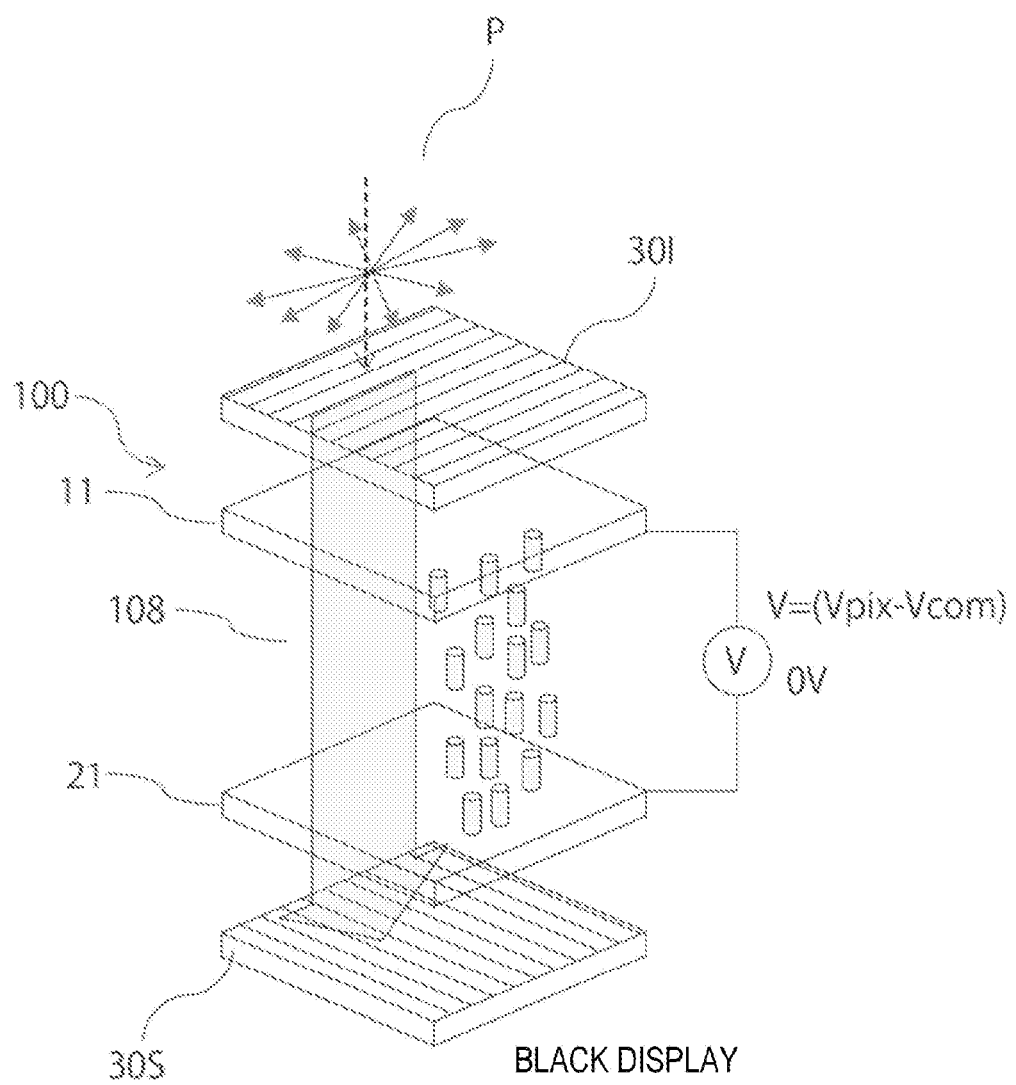
FIG. 7A is a diagram illustrating a state of white display.
Figure 7B:
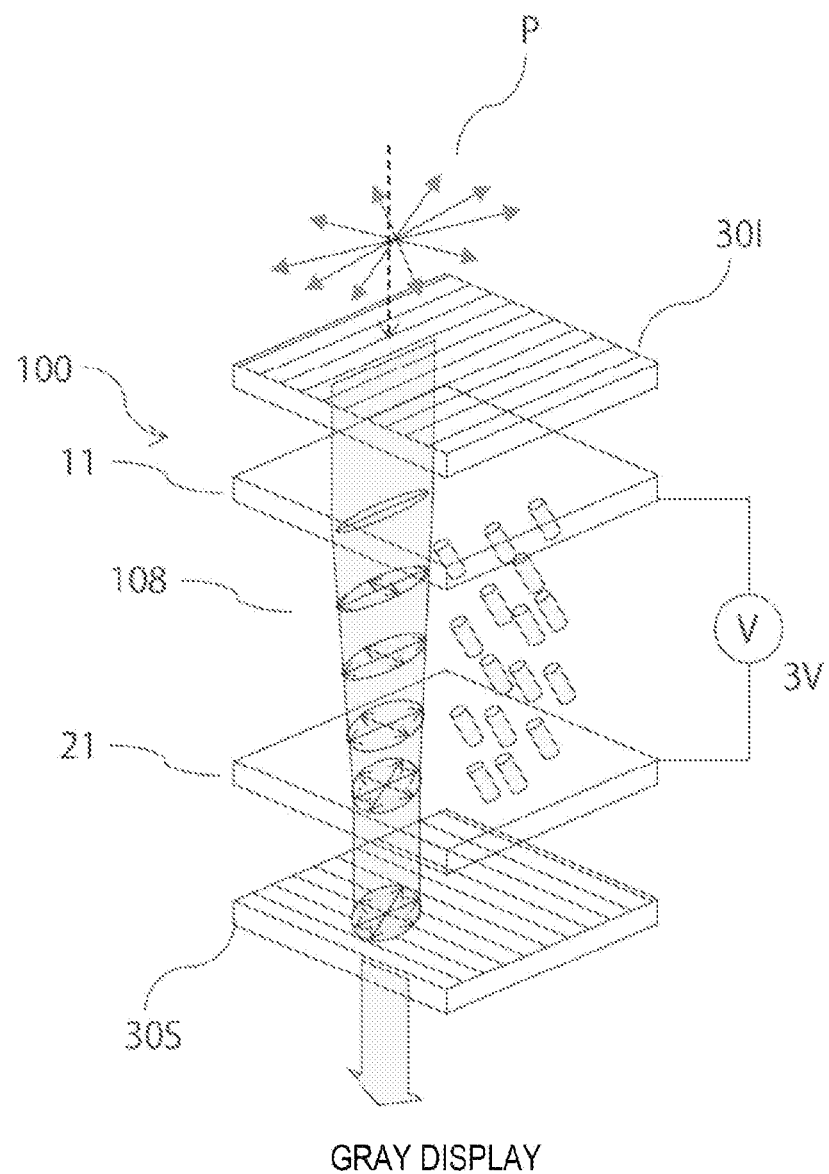
FIG. 7B is a diagram illustrating a state of gray display.
Figure 7C:
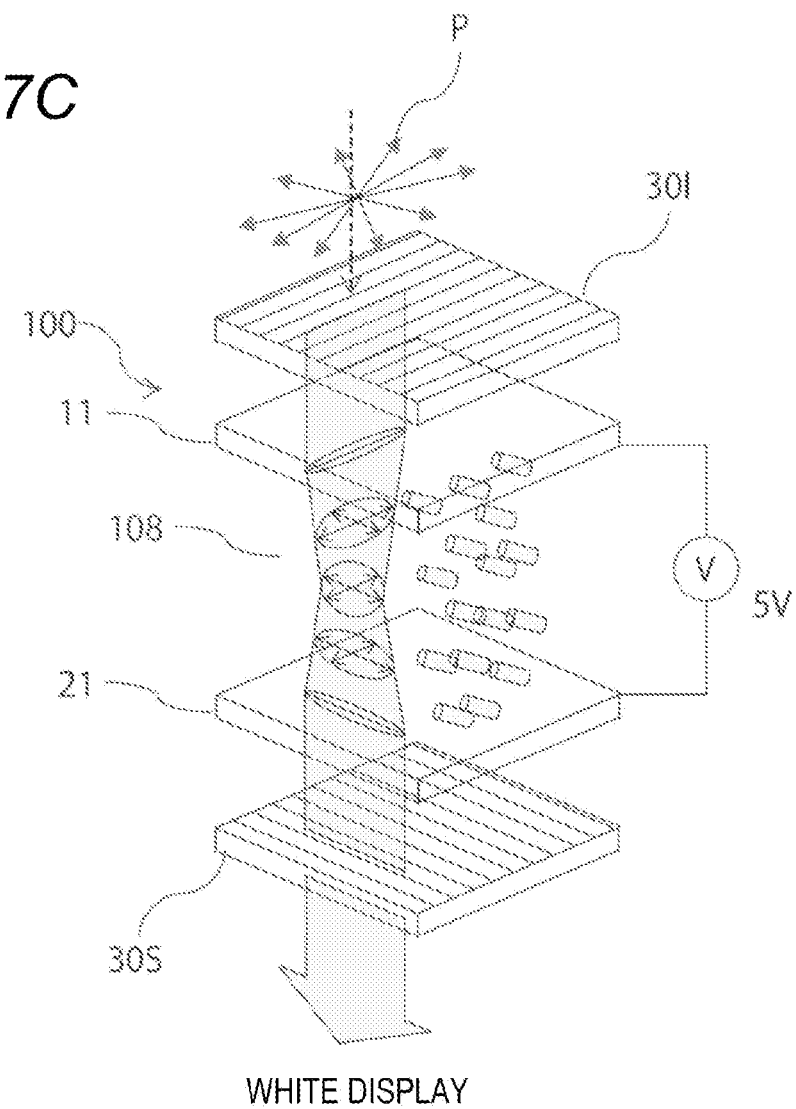
FIG. 7C is a view illustrating a state of black display.

FIGS. 7A, 7B, and 7C are diagrams schematically illustrating polarization states of the polarizing plate 8. FIG. 7A illustrates a state of white display, FIG. 7B illustrates a state of gray display, and FIG. 7C illustrates a state of black display. In FIGS. 7A, 7B, and 7C, a state P schematically illustrates a change in polarization components of the backlight. As illustrated in FIGS. 7A, 7B, and 7C, an optical change generated by changing the molecular structure of the liquid crystal 108 by the absolute value of the potential difference V=(Vpix−Vcom) between the pixel electrode 11 and the counter electrode 21 is used for display.

Figure 8:
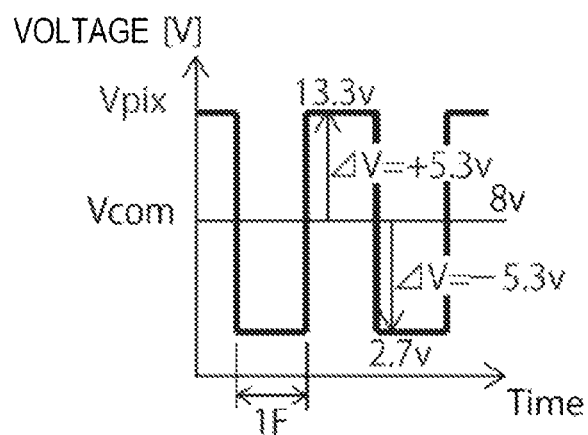
FIG. 8 is a diagram illustrating an example of DC driving of a liquid crystal.

FIG. 8 is a diagram illustrating an example of DC driving of the liquid crystal 108. The horizontal axis represents time, and the vertical axis represents the voltage of the pixel signal Vpix and the common potential Vcom. As illustrated in FIG. 8, in the DC driving, the common potential Vcom applied to the counter electrode 21 is set to a fixed value, and the pixel signal Vpix applied to the pixel electrode 11 is increased or decreased with respect to the common potential Vcom. For example, the common potential Vcom is fixed to 8 bolts, and the pixel signal Vpix is increased or decreased to 13.3 volts or 2.7 volts. In this case, in a case where 13.3 volts is applied to the pixel electrode 11, a difference of 5.3 volts is positively applied. On the other hand, in a case where 2.7 volts is applied to the pixel electrode 11, a difference of −5.3 volts is negatively applied.

Figure 9A:
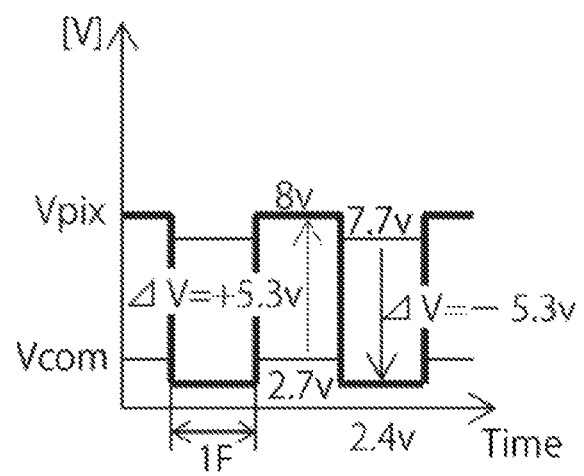
FIG. 9A is a diagram illustrating an example of AC driving of a liquid crystal.

FIG. 9A is a diagram illustrating an example of AC driving of the liquid crystal 108. The horizontal axis represents time, and the vertical axis represents the pixel signal Vpix and the common potential Vcom. As illustrated in FIG. 9A, in the AC driving, the common potential Vcom applied to the counter electrode 21 and the pixel signal Vpix applied to the pixel electrode 11 fluctuate. For example, in a case where the common potential Vcom is set to 2.7 volts and 8.0 volts is applied as the pixel signal Vpix to the pixel electrode 11, the difference of 5.3 volts is positively applied. On the other hand, in a case where the common potential Vcom is set to 7.7 volts and 2.4 volts is applied as the pixel signal Vpix to the pixel electrode 11, the difference of −5.3 volts is negatively applied.

Figure 9B:
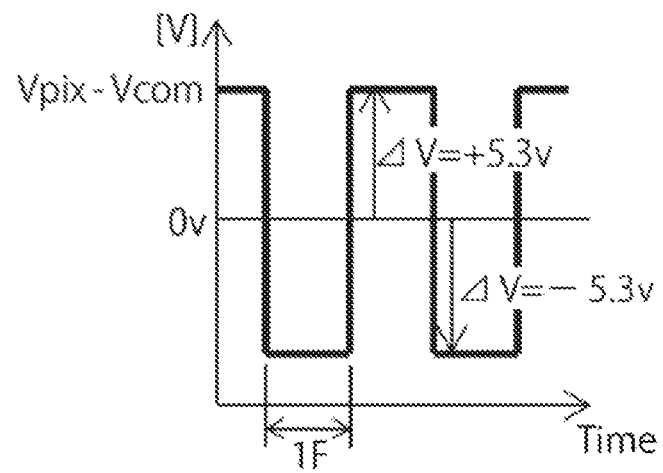
FIG. 9B is a diagram in which the example of the AC driving illustrated in FIG. 9A is set as a difference value between the pixel signal and a common potential and 0 volts is set as a reference.

FIG. 9B is a diagram in which the example of the AC driving illustrated in FIG. 9A is set as the difference value between the pixel signal Vpix and a common potential Vcom and 0 volts is set as a reference. The horizontal axis represents time, and the vertical axis represents the difference value between the pixel signal Vpix and the common potential Vcom. As illustrated in FIG. 9B, even in the case of the AC driving, a potential difference equivalent to the positive application and the negative application in the case of the DC driving is alternately applied. As described above, since the potential difference is the same in both the case of the AC driving and the case of the DC driving, the transmittance fluctuates similarly. Note that in the present embodiment, an example of DC driving will be described, but the present invention is not limited thereto, and AC driving may be used.

Figure 10:
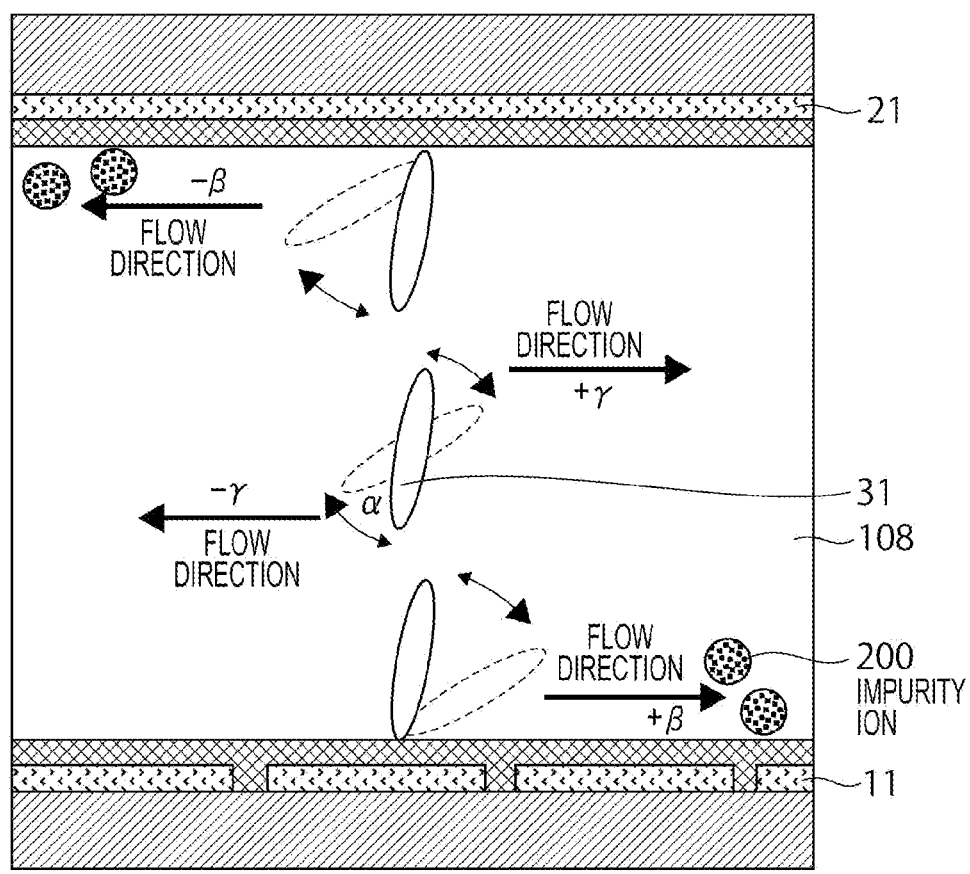
FIG. 10 is a cross-sectional view of a display device for describing a phenomenon caused by influence of ionic impurities.

FIG. 10 is a cross-sectional view of the display device 1 for describing a phenomenon caused by influence of ionic impurities. As illustrated in FIG. 8, the polarity of the voltage applied to the liquid crystal 108 is reversed between positive and negative for each frame period. In response to the AC waveform, the liquid crystal molecules also slightly fluctuate in the alignment in the polar angle direction. The velocity is different between an inclination direction and a relaxation direction (a in the drawing). Therefore, a minute flow is generated in the liquid crystal 108. In an intermediate layer of the liquid crystal layer 108, since fluctuations are generated with the center of gravity of the liquid crystal molecules as a rotation axis, minute flows (+γ, −γ in the drawing) are offset, and a force for moving impurity ions is not generated. On the other hand, at the liquid crystal layer interface of the substrates facing each other, since one of the molecular chains of the liquid crystal molecules is fixed to the alignment film, the fluctuation becomes a contact point with the alignment film interface, and a minute flow appears in the alignment direction of the liquid crystal 108 (+β, −β in the drawing). Then, this flow is reversed in the opposite direction on the opposing substrate and is offset as a whole, but becomes a minute flow in one direction at the interface, and impurity ions are moved by this flow.

Figure 11:
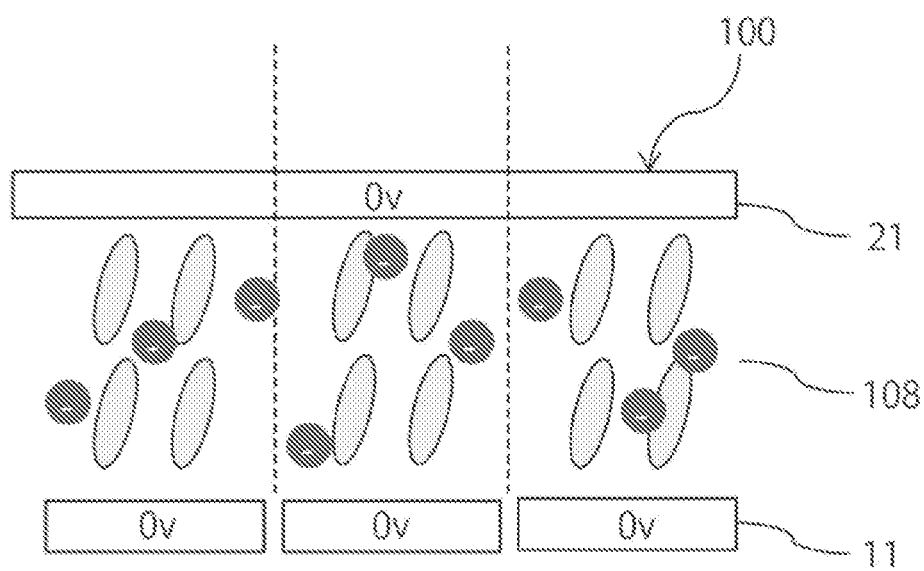
FIG. 11 is a diagram schematically illustrating a liquid crystal and impurity ions in a case of black display.

Here, the burn-in phenomenon will be described with reference to FIGS. 11 to 13. FIG. 11 is a diagram schematically illustrating the liquid crystal 108 and impurity ions in a case of black display. In the following description, the movement of the negative impurity ions will be described to simplify the description, and the movement of the positive impurity ions will be omitted, but the positive impurity ions move electrically in the opposite direction to the negative impurity ions. No voltage is applied to the pixel electrode 11 and the counter electrode 21, and no electric field is generated, so that impurity ions are also stopped.

Figure 12A:
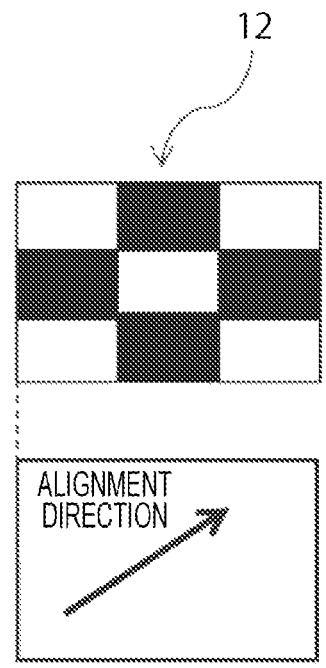
FIG. 12A is a diagram illustrating an example in which an applied voltage is changed in a checkered pattern for each pixel.

FIG. 12A is a diagram illustrating an example in which an applied voltage is changed in a checkered pattern for each pixel. The upper diagram indicates the applied state of the voltage in terms of concentration. In white regions, a high voltage, for example, ±5.3 volts is applied to the pixel electrode 11, and in black regions, for example, 0 volts is applied. The lower diagram indicates the alignment direction of the liquid crystal 108. As described above, the impurity ions move in the alignment direction.

Figure 12B:
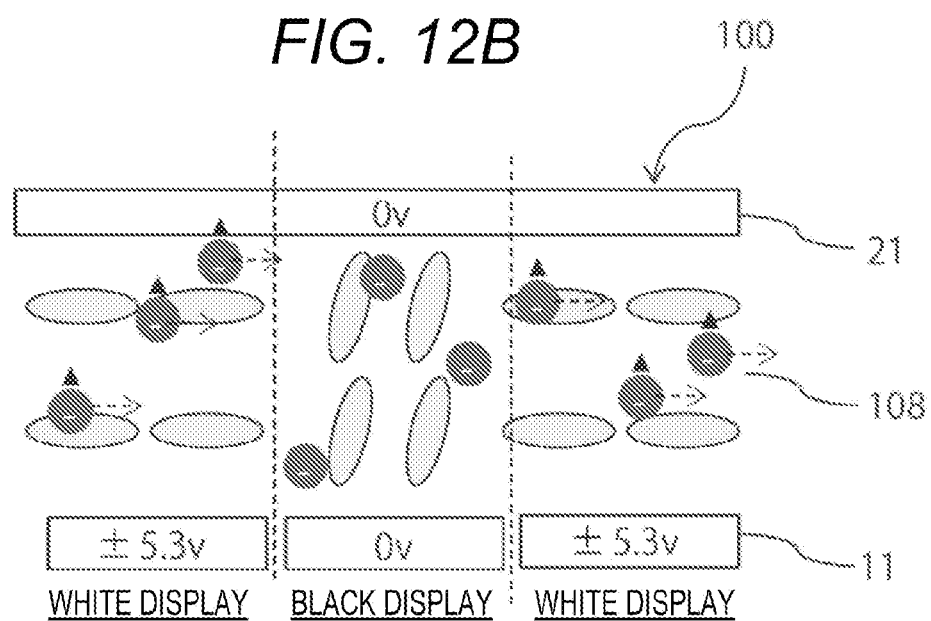
FIG. 12B is a diagram illustrating states of a pixel electrode, a liquid crystal, and impurity ions corresponding to a partial region of FIG. 12A.
Figure 12C:
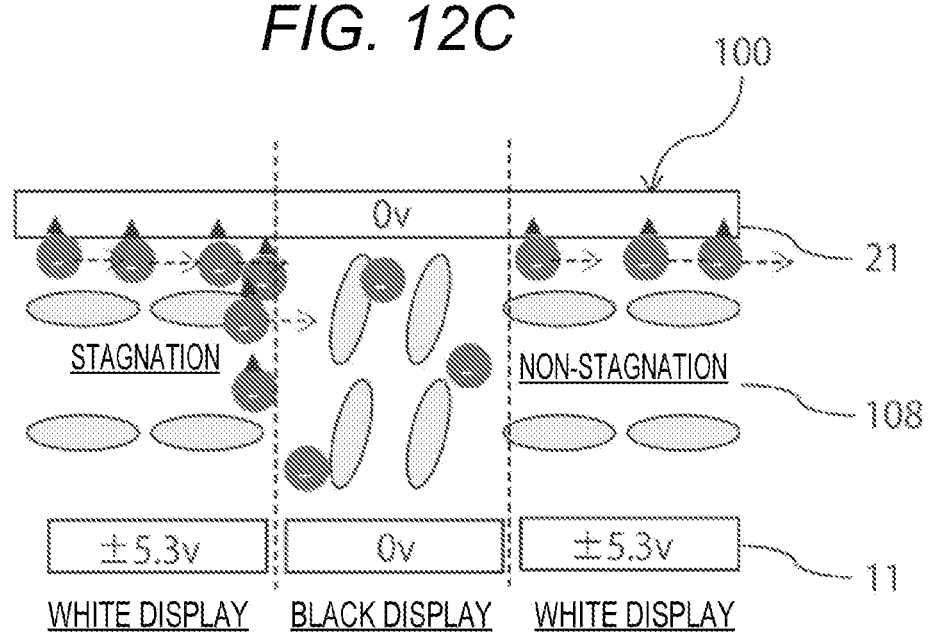
FIG. 12C is a diagram illustrating a case where more time has elapsed in a state where driving similar to that in FIG. 12B is performed.

FIG. 12B is a diagram illustrating states of the pixel electrode 11, the liquid crystal 108, and the impurity ions corresponding to a partial region of FIG. 12A. FIG. 12C is a diagram illustrating a case where time has elapsed from FIG. 12B in a state where driving similar to that in FIG. 12B is performed. Driving in which positive application and negative application are repeated as illustrated in FIG. 8 is performed. In this case, it is difficult to make the difference of the absolute values between the positive application and the negative application zero, and a minute potential difference occurs. Therefore, as illustrated in FIG. 12B, negative impurity ions move in the alignment direction due to the imbalance of the vertical electric field, and approach the counter electrode 21, for example. The white display pixel is in a condition that the imbalance influence of the vertical electric field becomes the largest because of the high voltage application.

As illustrated in FIG. 12C, since there is no potential difference in the black display pixel, negative impurity ions are stopped. On the other hand, negative impurity ions in the white display pixel flow along the alignment direction. Therefore, negative impurity ions stagnate on the surface of the counter electrode 21 and the boundary region between the white pixel and the black pixel.

Figure 13:
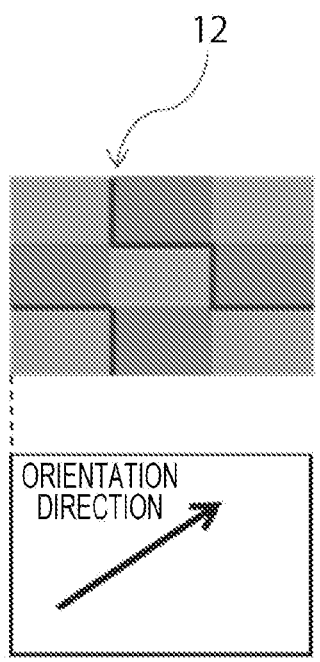
FIG. 13 is a diagram schematically illustrating a case where entire pixels are uniformly displayed in gray.

FIG. 13 is a diagram schematically illustrating a case where entire pixels are uniformly displayed in gray. As illustrated in FIG. 13, negative impurity ions stagnate on the surface of the counter electrode 21 and the boundary region between the white pixel and the black pixel, thereby generating the vertical electric field due to the impurity ions. Therefore, in a case where the display color is, for example, gray or the like, the difference in the vertical electric field appears as a difference in color in the boundary region between the original white display pixel and the black display pixel, and the white display region. This phenomenon is referred to as a burn-in phenomenon in the present embodiment.

Figure 14A:
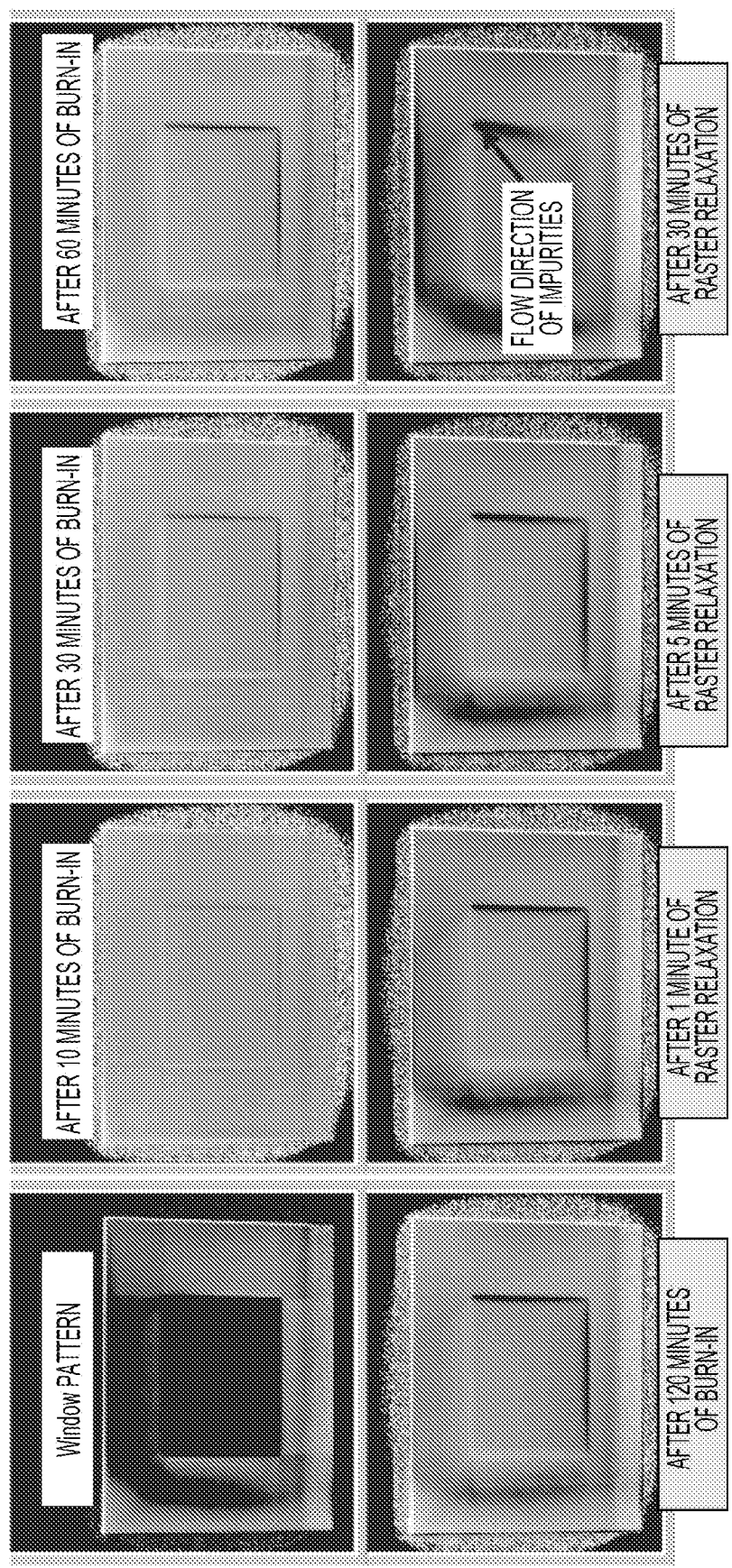
FIG. 14A is a diagram illustrating a lapse of time of a burn-in phenomenon in a case where black-and-white display is performed as a display pattern.

FIG. 14A is a diagram illustrating a lapse of time of a burn-in phenomenon in a case where black-and-white display is performed as a display pattern (Window pattern). "After 10 minutes of burn-in", "after 30 minutes of burn-in", "after 60 minutes of burn-in", and "after 120 minutes of burn-in" are images in gray display obtained by displaying a display pattern as a still image for 10 minutes, 30 minutes, 60 minutes, and 120 minutes, respectively. On the other hand, "after 1 minute of raster relaxation", "after 5 minutes of raster relaxation", and "after 30 minutes of raster relaxation" are images in gray display after the gray display of "after 120 minutes of burn-in" is continued for 1 minute, 5 minutes, and 30 minutes, respectively, while the temperature of the display device 1 is maintained at 70 degrees, for example. As can be seen from the images of "after 10 minutes of burn-in", "after 30 minutes of burn-in", "after 60 minutes of burn-in", and "after 120 minutes of burn-in", the burn-in is increased as time elapses. On the other hand, in a case where gray display is continued while the temperature of the display device 1 is maintained at 70 degrees, for example, the burn-in phenomenon is slowly relaxed.

Figure 14B:
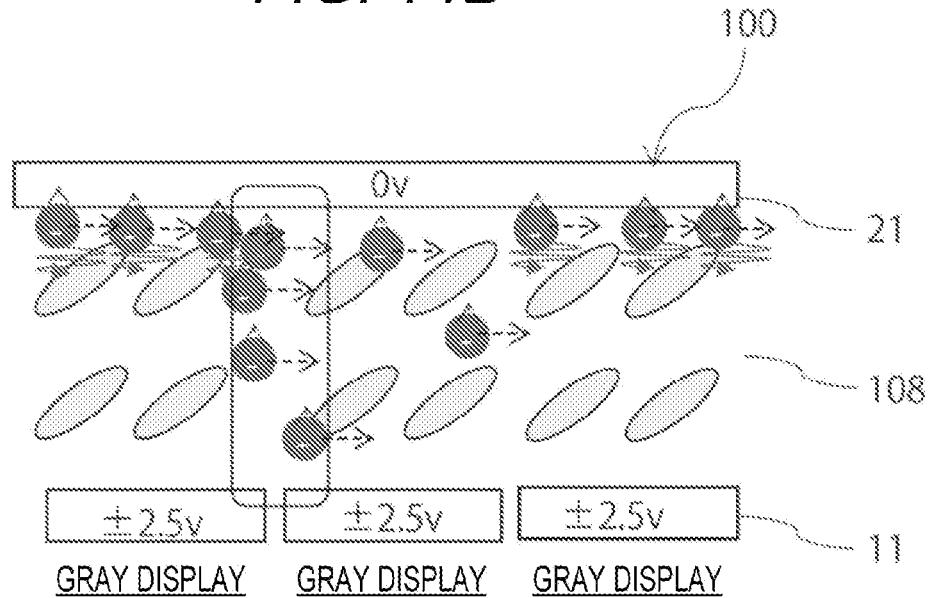
FIG. 14B is a diagram schematically illustrating a state in which raster relaxation is performed.

FIG. 14B is a diagram schematically illustrating a state in which raster relaxation is performed. As illustrated in FIG. 14B, molecules of the liquid crystal 108 make Brownian motion by heat, and impurity ions are diffused, so that stagnation is relaxed, and flow is caused in the alignment direction.

First, relaxation driving during still image display will be described. In the relaxation driving according to the present embodiment, driving for relaxing impurity ions in a shorter time is performed by causing vibration of molecules of the liquid crystal 108.

Figure 15:
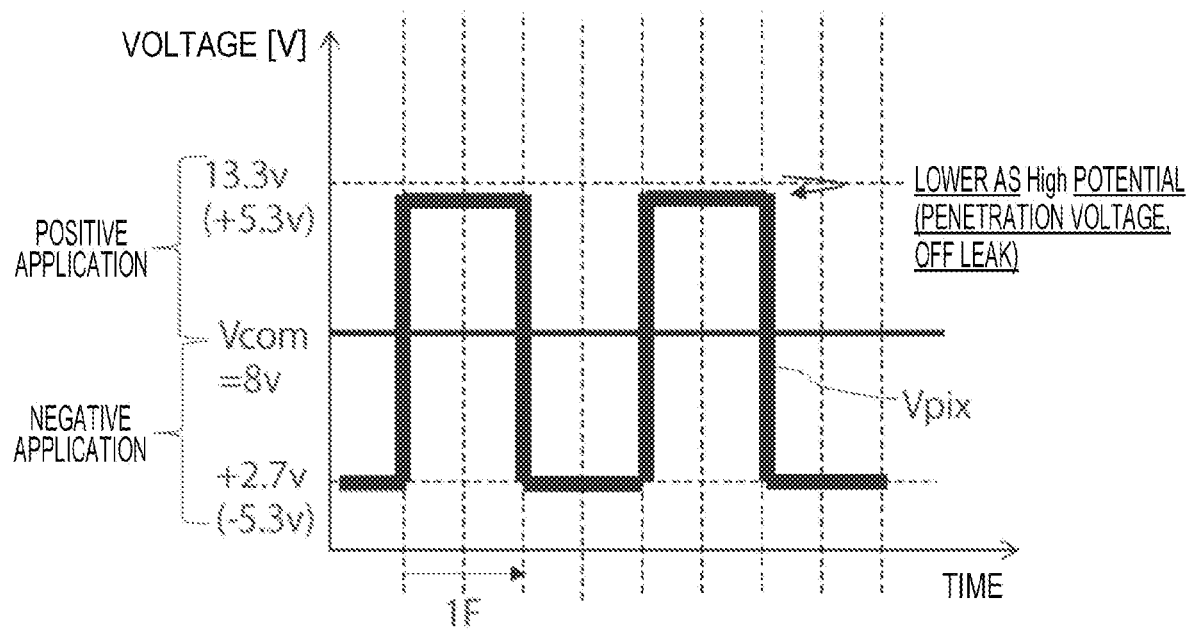
FIG. 15 is a diagram illustrating a control example of a third mode which is relaxation driving at the time of still image display.

FIG. 15 is a diagram illustrating a control example of the third mode which is relaxation driving at the time of still image display. The horizontal axis represents time, and the vertical axis represents voltage. As illustrated in FIG. 15, in the third mode, driving is performed to slightly shift the magnitudes of the absolute value of the potential in the positive application and the absolute value of the potential in the negative application.

The timing control unit 200 (refer to FIG. 2) outputs a control signal indicating the third mode to the mode control unit 202 in the relaxation driving during the still image display. Therefore, the mode control unit 202 causes the gradation conversion unit 204 to output the pixel signal Vpix that makes the magnitude of the absolute value of the potential in the positive application different from the magnitude of the absolute value of potential in the negative application, as the control of the third mode.

Figure 16:
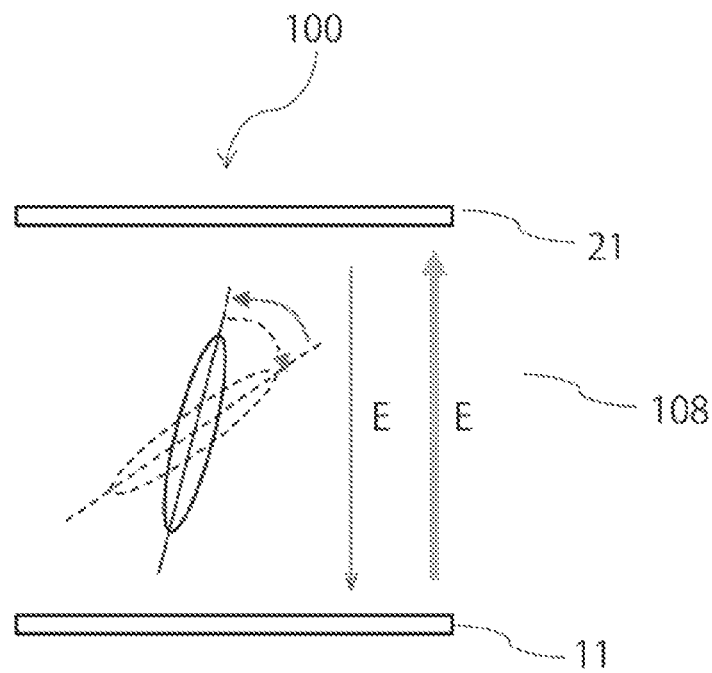
FIG. 16 is a diagram schematically illustrating molecular vibration of a liquid crystal in relaxation driving.

FIG. 16 is a diagram schematically illustrating molecular vibration of the liquid crystal 108 in the relaxation driving. As illustrated in FIG. 16, in the control in the third mode, the molecules of the liquid crystal 108 are vibrated in order to make the magnitude of the absolute value of the potential in the positive application different from the magnitude of the absolute value of the potential in the negative application. This molecular vibration of the liquid crystal 108 generates a larger transverse electric field, and the impurity ions are vibrated more greatly to flow in the alignment direction, and the relaxation rate becomes faster.

Figure 17:
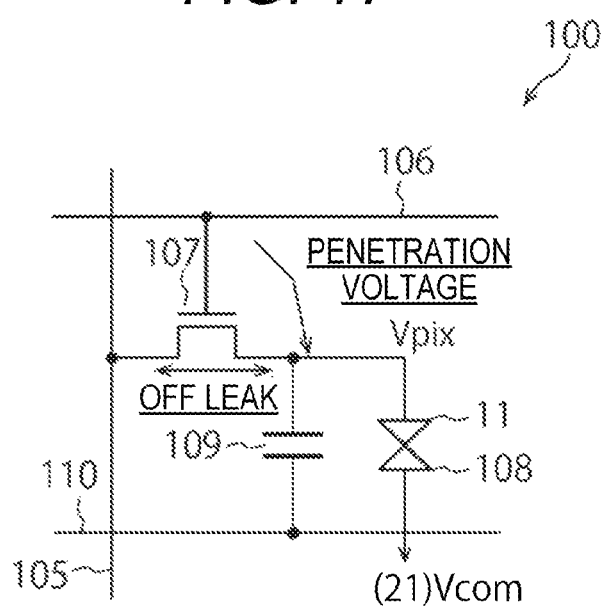
FIG. 17 is a diagram illustrating an example of a state of a pixel in a third mode.

FIG. 17 is a diagram illustrating an example of a driving state of the pixel 100 in the third mode. In an example of the relaxation driving of the present embodiment, in a case where the mode control unit 202 lowers the gate voltage of the transistor 107 from ON to OFF, a so-called penetration voltage is generated in which the voltage applied to the liquid crystal is slightly lowered by a parasitic capacitance generated between the gate and the pixel electrode 11. At the time of the relaxation driving, the potential difference due to the penetration voltage is not corrected and maintained.

Furthermore, the transistor 107 has an OFF leak. A leakage amount also varies depending on an operating point. For example, in a case where the potential difference between the source and the drain is large at a constant gate potential, the OFF leakage amount becomes larger. The OFF leakage amount also causes a difference between the absolute value of the potential in the positive application and the absolute value of the potential in the negative application. In the example of the relaxation driving of the present embodiment, the mode control unit 202 does not correct and maintains the potential difference due to the OFF leakage amount at the time of the relaxation driving. Therefore, as illustrated in FIG. 15, it is possible to easily perform driving to slightly shift the magnitudes of the absolute value of the potential in the positive application and the absolute value of the potential in the negative application by ON/OFF control of the transistor 107.

Figure 18:
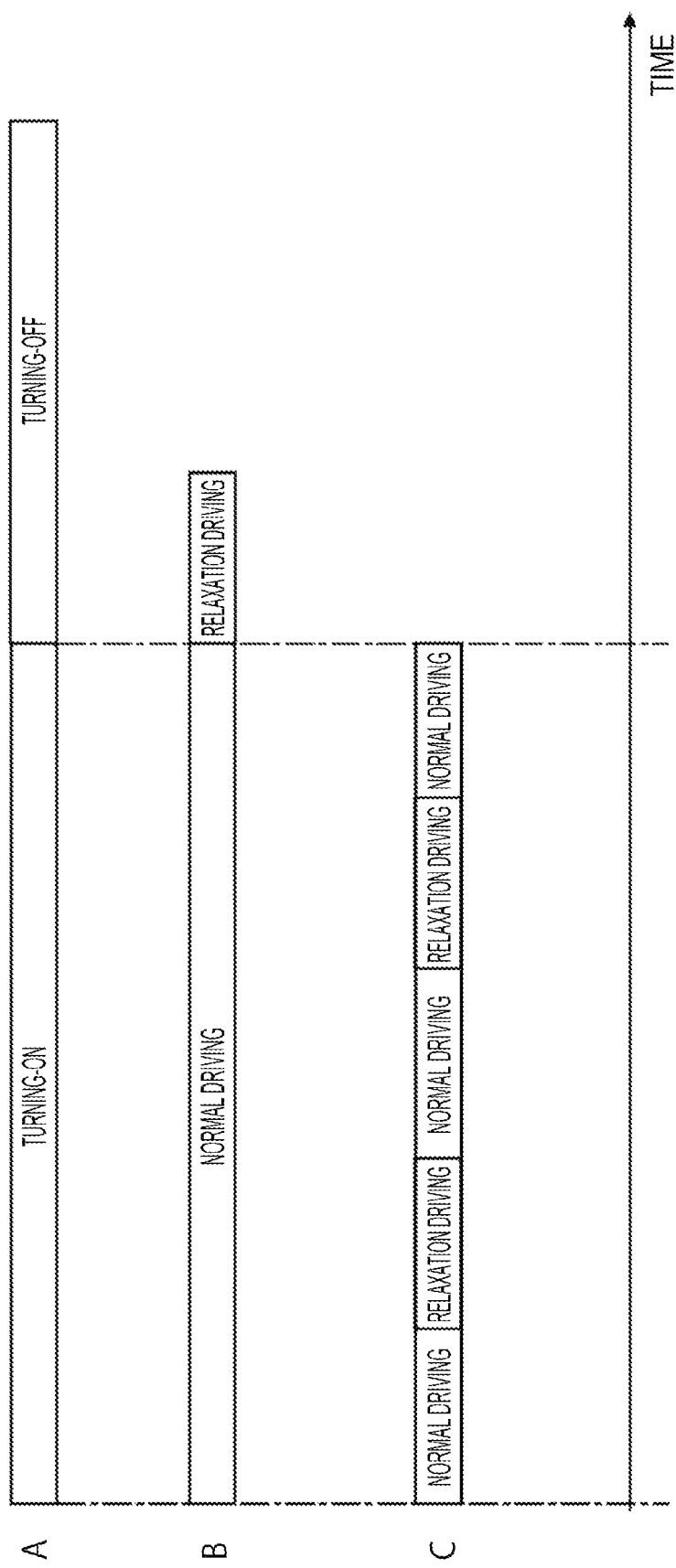
FIG. 18 is a timing chart of relaxation driving in a third mode.

FIG. 18 is a timing chart of the relaxation driving in the third mode. A column A indicates turning-on and turning-off of the backlight 5 (refer to FIG. 1). A column B indicates an example in which the third mode which is the relaxation driving is set to the turning-off, and a column C indicates an example in which the third mode which is the relaxation driving is set to the turning-on of the backlight 5 (refer to FIG. 1).

The timing control unit 200 (refer to FIG. 2) supplies a control signal indicating the relaxation mode to the mode control unit 202 (refer to FIG. 2) at the time point when the normal driving of the still image is ended. Therefore, the mode control unit 202 performs the relaxation driving illustrated in FIG. 15, for example. In this case, the absolute value of the pixel signal Vpix is set to, for example, the maximum value. As described above, in the period of the first mode in which the normal driving is performed, the mode control unit 202 performs the normal driving in which the potential difference between the potential of the pixel signal Vpix and the common potential Vcom is changed according to the input pixel signal Vsig. On the other hand, in the period of the third mode, the mode control unit 202 performs the relaxation driving in which the potential difference between the potential of the pixel signal Vpix and the common potential Vcom is periodically changed regardless of the input pixel signal Vsig. That is, in the period of the first mode in which the normal driving is performed, the mode control unit 202 outputs the control signal including the information of the first mode, to the gradation conversion unit 204. On the other hand, in the period of the third mode in which the relaxation driving is performed, the mode control unit 202 outputs the control signal including the information of the third mode, to the gradation conversion unit 204. As described above, since the relaxation driving in the third mode is performed after the normal driving is ended, it is possible to perform relaxation in a shorter time even in a case where the burn-in occurs. Furthermore, in the column B, the mode control unit 202 (refer to FIG. 2) performs the driving of the third mode in accordance with the turn-off period of the backlight. In this case, since the backlight is turned off, the viewer can observe a normal image when the backlight is turned on. In the column C, the mode control unit 202 (refer to FIG. 2) also performs the driving of the third mode even in the turn-on period of the backlight. In this case, even in a case where a state in which the pixel signal Vpix is large is continued, the burn-in can be suppressed.

Furthermore, the timing control unit 200 may monitor the magnitude of the pixel signal Vpix of the normal driving, and cause the mode control unit 202 to perform the relaxation driving in the third mode according to the magnitude of the pixel signal Vpix. For example, the timing control unit 200 causes the mode control unit 202 to perform the relaxation driving in a case where the pixel signal Vpix exceeds a predetermined value. The timing control unit 200 causes the mode control unit 202 to perform the relaxation driving, for example, in a case where the absolute value of the positive and negative applied voltages exceeds 90% of the maximum value. Therefore, the relaxation driving can be performed only in a case where there is a high possibility that the burn-in occurs and affects the display, so that the display processing is more efficient.

Figure 19:
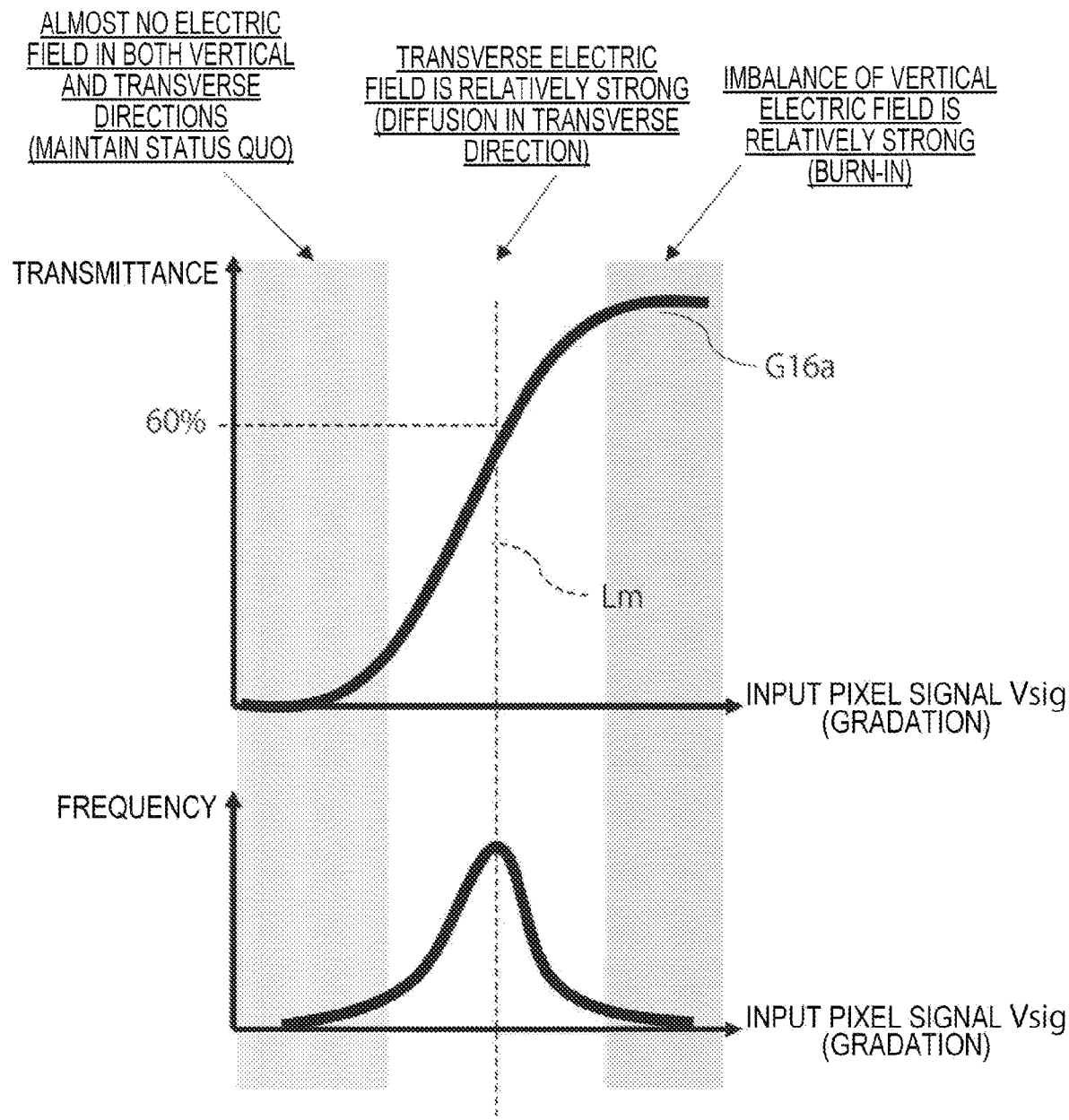
FIG. 19 is a diagram illustrating a three-gradation curve and an occurrence frequency of an input pixel signal.

Next, the fourth mode which is the relaxation driving during the moving image display will be described. FIG. 19 is a diagram illustrating the third gradation curve G16*a* and the occurrence frequency of the input pixel signal Vsig. The horizontal axis represents the input pixel signal Vsig, and the vertical axis represents the transmittance and the occurrence frequency of the input pixel signal Vsig. Regarding the occurrence frequency of the input pixel signal Vsig in a case where the third gradation curve G16*a* (refer to FIG. 4A) during the normal driving is used, the occurrence frequency of the input pixel signal Vsig corresponding to the central portion of the third gradation curve G16*a* through which a center line Lm passes is generally the highest. In other words, the third gradation curve G16*a* is formed such that the point where the occurrence frequency of the input pixel signal Vsig is the highest coincides with the central portion of the third gradation curve G16*a*.

As illustrated in FIGS. 4A and 4B, the absolute value of the difference between the pixel signal Vpix and the common voltage Vcom is increased as the input pixel signal Vsig is increased. Therefore, as the pixel signal Vpix is increased, the possibility that the burn-in occurs is increased. On the other hand, in a case where the input pixel signal Vsig corresponding to the region where the third gradation curve G16*a* is linearly changed is input, the transverse electric field generated by the molecules of the liquid crystal 108 is increased. Furthermore, in the region where the value of the input pixel signal Vsig is small, the absolute value of the difference between the pixel signal Vpix and the common voltage Vcom is also decreased, and the transverse electric field and the vertical electric field are decreased.

The timing control unit 200 (refer to FIG. 2) outputs a control signal indicating the fourth mode to the mode control unit 202 in the relaxation driving during the moving image display. Therefore, the mode control unit 202 causes the gradation conversion unit 204 to alternately convert the input pixel signal Vsig into the pixel signal Vpix by using the first gradation conversion unit 204a and the second gradation conversion unit 204b, as the control of the fourth mode.

Figure 20:
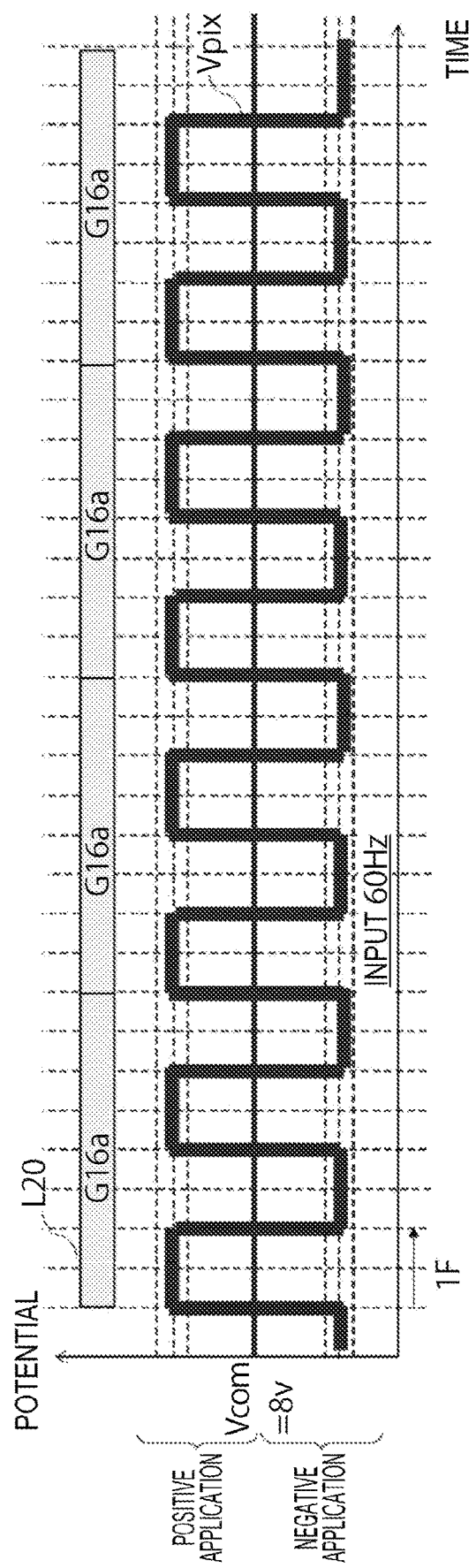
FIG. 20 is a timing chart in a normal mode of a moving image.

FIG. 20 is a timing chart in the normal mode of the moving image. The horizontal axis represents time, and the vertical axis represents voltage. A line L20 indicates the type of the gradation curve. That is, in the normal mode, the third gradation curve G16a (refer to FIG. 4A) is used. As illustrated in FIG. 18, in the moving image display, the input image is changed at 60 Hz, for example. In the normal mode, in a case where there is no change in the input image, there is a high possibility that the burn-in occurs in a case where a high-luminance fixed display pattern is continued.

Figure 21:
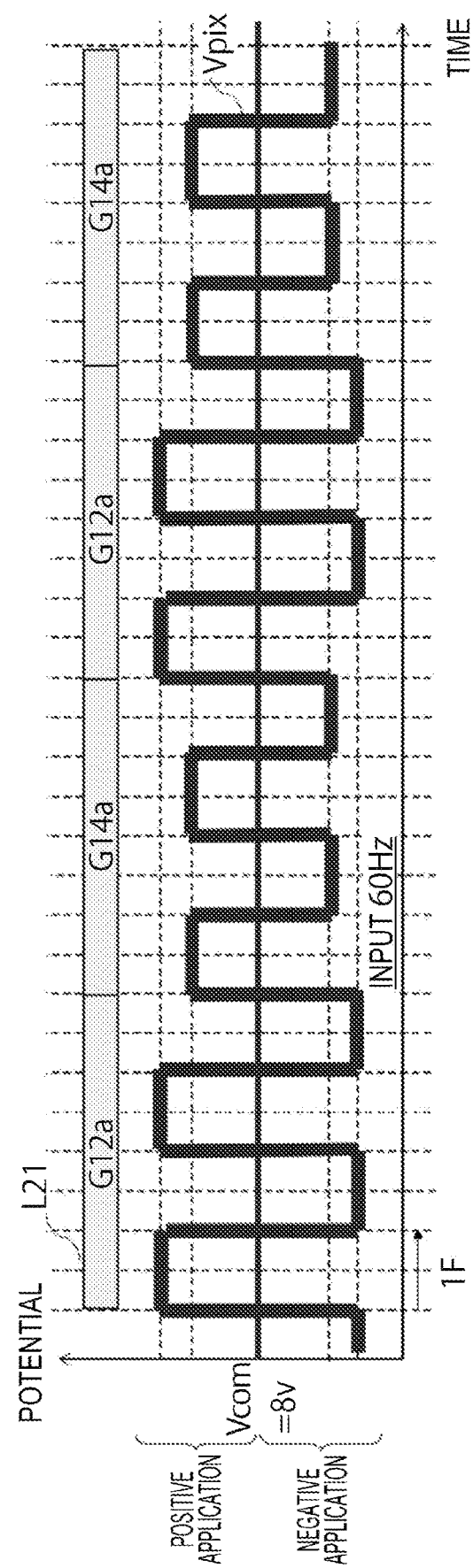
FIG. 21 is a timing chart in a fourth mode which is a relaxation mode of a moving image.

FIG. 21 is a timing chart in the fourth mode which is the relaxation mode of the moving image. The horizontal axis represents time, and the vertical axis represents voltage. A line L21 indicates the type of the gradation curve. That is, in the relaxation mode, the first gradation curve G12a (refer to FIG. 4A) and the second gradation curve G14a (refer to FIG. 4A) are alternately used every two. More specifically, the gradation conversion unit 204 (refer to FIG. 2) sequentially uses the first gradation curve G12a and the first gradation curve G12a, and then sequentially uses the second gradation curve G14a and the second gradation curve G14a. As illustrated in FIG. 21, in the moving image display, the input image is changed at 60 Hz, for example. In the fourth mode, even in a case where the high-luminance fixed display pattern is displayed, the liquid crystal molecules can be vibrated and the burn-in can be suppressed by alternately using the first gradation curve G12a and the second gradation curve G14a every two.

In this case, as described with reference to FIG. 4C, the average transmittance of the liquid crystal 108 is equivalent to that when the third gradation curve G16a (refer to FIG. 4A) is used. Therefore, the viewer watching the display device 1 recognizes the display screen as the display screen equivalent to that when the third gradation curve G16a (refer to FIG. 4A) is used. Furthermore, as described with reference to FIG. 19, in the normal pixel display, the frequency of the input pixel signal Vsig capable of increasing the transverse electric field is increased, so that the liquid crystal molecules can be vibrated more efficiently. Therefore, this makes it possible to more efficiently suppress the burn-in.

Figure 22:
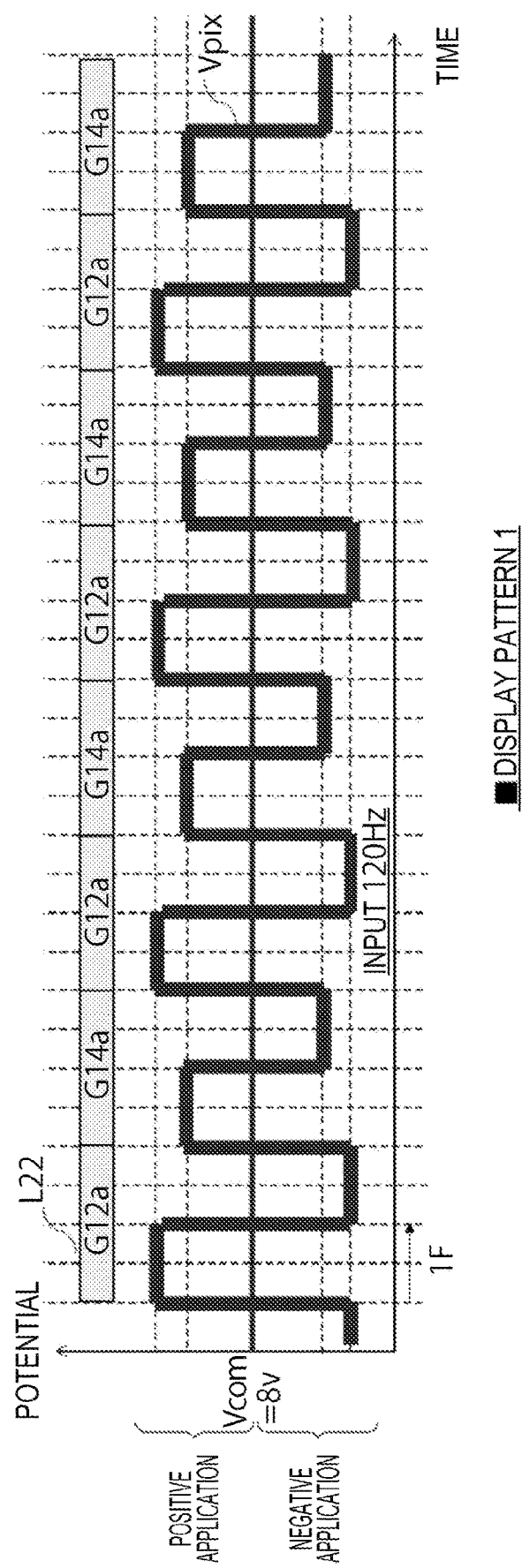
FIG. 22 is a timing chart in the fourth mode in a display pattern 1 of a 120 Hz moving image.

FIG. 22 is a timing chart in the fourth mode in a display pattern 1 of the 120 Hz moving image. The horizontal axis represents time, and the vertical axis represents voltage. A line L22 indicates the type of the gradation curve. That is, in the fourth mode in the display pattern 1, the first gradation curve G12a (refer to FIG. 4A) and the third gradation curve G16a (refer to FIG. 4A) are alternately used. As illustrated in FIG. 22, in the moving image display, the input image is changed at 120 Hz, for example. In the fourth mode in display pattern 1, even in the fixed pattern, the liquid crystal molecules can be vibrated by alternately using the first gradation curve G12a and the second gradation curve G14a, and the burn-in can be suppressed. In this case, as described with reference to FIG. 4C, the average transmittance of the liquid crystal 108 is equivalent to that when the third gradation curve G16a (refer to FIG. 4A) is used. Therefore, the viewer watching the display device 1 recognizes the display screen as the display screen equivalent to that when the third gradation curve G16a (refer to FIG. 4A) is used. Furthermore, as described with reference to FIG. 19, in the normal pixel display, the frequency of the input pixel signal Vsig capable of increasing the transverse electric field is increased, so that the liquid crystal molecules can be vibrated more efficiently. Therefore, this makes it possible to more efficiently suppress the burn-in.

Figure 23:
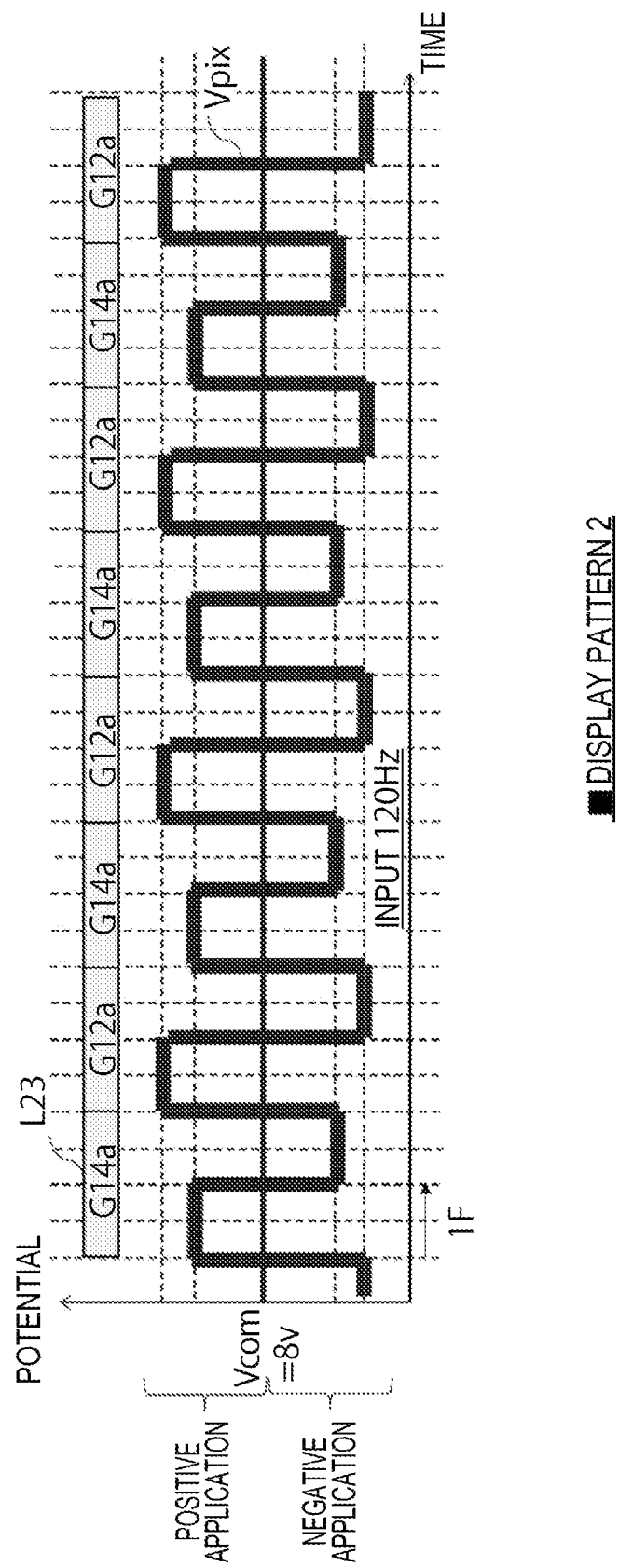
FIG. 23 is a timing chart in the fourth mode in a display pattern 2 of a 120 Hz moving image.

FIG. 23 is a timing chart in the fourth mode in a display pattern 2 of the 120 Hz moving image. The horizontal axis represents time, and the vertical axis represents voltage. A line L23 indicates the type of the gradation curve. That is, in the relaxation mode in the display pattern 2, the second gradation curve G14a (refer to FIG. 4A) and the first gradation curve G12a (refer to FIG. 4A) are alternately used contrary to FIG. 22. As illustrated in FIG. 23, in the moving image display, the input image is changed at 120 Hz, for example.

Figures 24A, 24B, 24C:
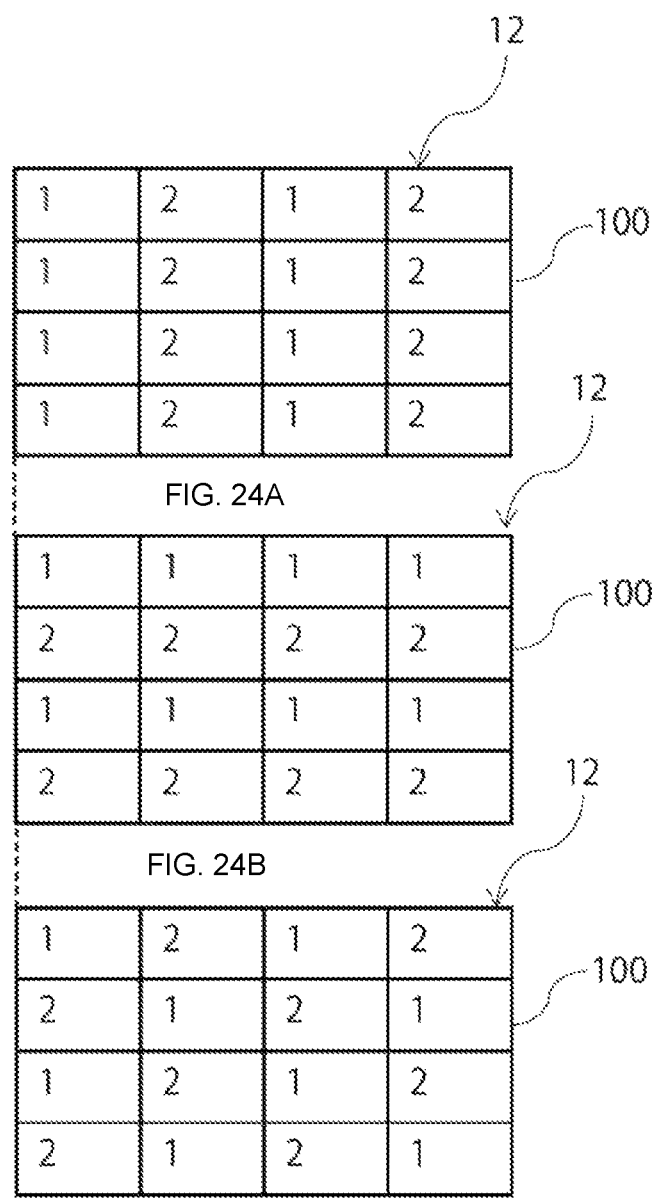
FIGS. 24A, 24B, and 24C are diagrams illustrating a combination example of display patterns for each pixel.

FIGS. 24A, 24B, and 24C are diagrams illustrating a combination example of display patterns for each pixel. In FIG. 24A, the display pattern 1 and the display pattern 2 are changed for each row in the effective pixel region 12. In a FIG. 24B, the display pattern 1 and the display pattern 2 are changed for each column in the effective pixel region 12. In FIG. 24C, the display pattern 1 and the display pattern 2 are changed in a checkered pattern shape for each pixel in the effective pixel region 12. As described above, since the first gradation curve G12a (refer to FIG. 4A) and the second gradation curve G14a (refer to FIG. 4A) are different between adjacent pixels, the mode control unit 202 performs control such that the potential difference applied between the adjacent pixels is different, and the potential difference is periodically switched. Therefore, this makes it possible to further increase the fluctuation of the transverse electric field, and to more efficiently perform relaxation of the burn-in. Also in this case, the transmittance of the liquid crystal 108 is equivalent to that in the case of using the third gradation curve G16a.

FIG. 25 is a timing chart of the fourth mode which is the relaxation driving in the moving image display. A column A indicates turning-on and turning-off of the backlight 5 (refer to FIG. 1). A column D indicates an example in which the fourth mode which is the relaxation driving of the moving image is set to the turning-off period, and a column E indicates an example in which the fourth mode which is the relaxation driving of the moving image is set to the turning-on period of the backlight 5 (refer to FIG. 1).

The timing control unit 200 (refer to FIG. 2) can switch between the normal driving in the moving image display and the fourth mode which is the relaxation driving of the moving image. The timing control unit 200 supplies, for example, a control signal indicating the relaxation mode to the mode control unit 202 (refer to FIG. 2).

Therefore, as indicated in the column D, the mode control unit 202 performs the relaxation driving of the fourth mode illustrated in FIGS. 21, 22, 23, 24A, 24B, and 24C, for example, in the turning-off time period of the backlight 5 (refer to FIG. 1). In this case, by setting the pixel signal Vpix to the maximum value, the relaxation of the burn-in can be performed in a shorter time.

Furthermore, as indicated in the column E, the mode control unit 202 may be caused to perform the relaxation driving of the fourth mode in the turning-on period of the backlight 5 (refer to FIG. 1). Also in this case, an image similar to that in the normal driving can be displayed. For example, the timing control unit 200 may cause the mode control unit 202 to perform the relaxation driving of the fourth mode according to the magnitude of the pixel signal Vpix. For example, in a case where the frequency of the pixel signal Vpix exceeding the predetermined value is increased, the timing control unit 200 causes the mode control unit 202 to perform the relaxation driving of the moving image during the turning-on. For example, in a case where the appearance frequency of the pixel signal Vpix in which the absolute value of the positive and negative applied voltages exceeds 90% of the maximum value exceeds 5%, for example, the timing control unit 200 causes the mode control unit 202 to perform the relaxation driving of the fourth mode. Therefore, for example, the relaxation driving can be performed only in a case where there is a high possibility that the burn-in occurs, so that the display processing is more efficient.

As described above, according to the present embodiment, the mode control unit 202 of the control circuit 20 performs the relaxation driving of periodically changing the magnitude of the pixel signal Vpix. Therefore, since the molecules of the liquid crystal 108 are periodically vibrated, the transverse electric field also periodically fluctuates, the movement amount of impurity ions can be further increased, and the burn-in by the impurity ions can be relaxed more quickly.

Second Embodiment

The display device 1 according to a second embodiment is different from the display device 1 according to the first embodiment in that a bias voltage is always applied during the relaxation mode. Hereinafter, differences from the display device 1 according to the first embodiment will be described.

Figure 26:
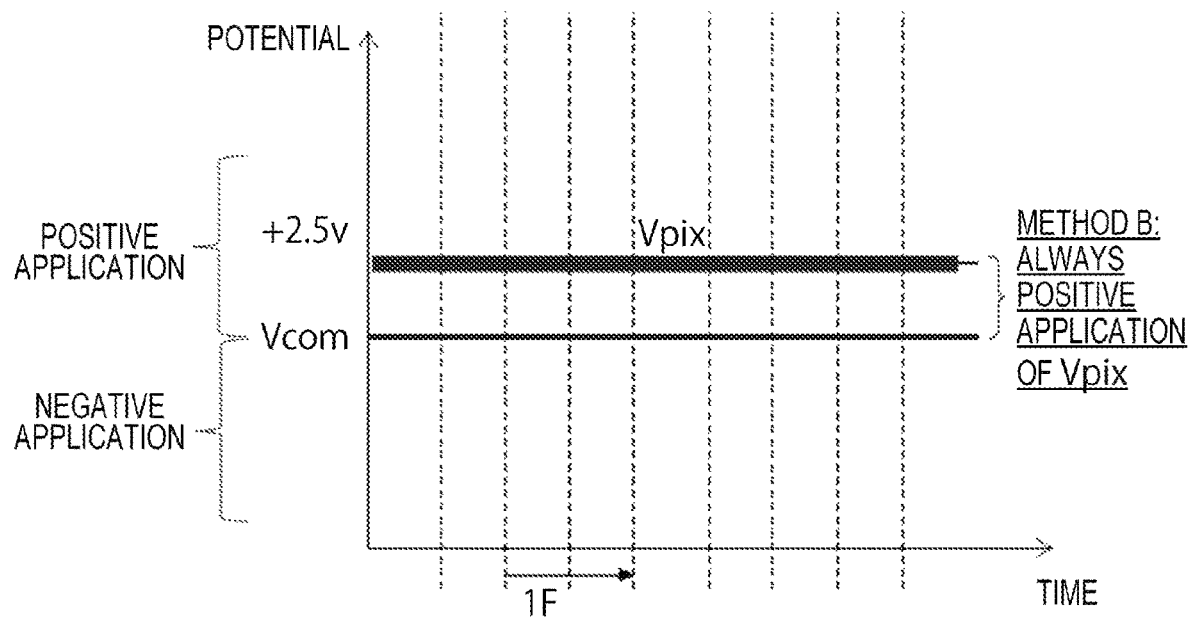
FIG. 26 is a timing chart of relaxation driving according to a second embodiment.

FIG. 26 is a timing chart of the relaxation driving according to the second embodiment. The timing control unit 200 (refer to FIG. 2) outputs a predetermined bias potential to the gradation processing unit 204 as the pixel signal Vpix at the time of the relaxation driving. Note that the bias potential in the present embodiment means a potential that generates a unidirectional vertical electric field in the liquid crystal 108.

Figure 27:
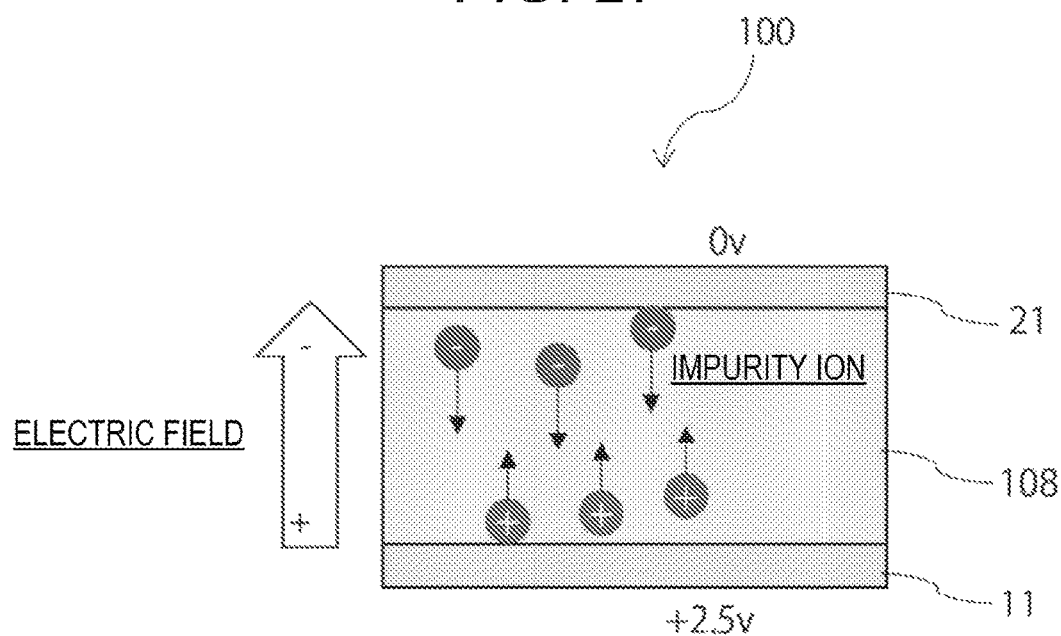
FIG. 27 is a diagram schematically illustrating movement of impurity ions in a case where a predetermined pixel signal is applied as a bias potential.

FIG. 27 is a diagram schematically illustrating movement of impurity ions in a case where the predetermined pixel signal Vpix is applied as the bias potential, as a control example in the relaxation mode. As illustrated in FIG. 27, under the control of the mode control unit 202 (refer to FIG. 2), for example, in a case where 2.5 volts is applied to the pixel electrode 11 as the pixel signal Vpix and the counter electrode 21 is set to 0 volts, a vertical electric field directed from the pixel electrode 11 side to the counter electrode 21 side is generated. Therefore, negative impurity ions are separated from the counter electrode 21, and positive impurity ions are separated from the pixel electrode 11. Therefore, the convected impurity ions on the surfaces of the pixel electrode 11 and the counter electrode 21 are separated, and flow along the alignment direction, and the burn-in is relaxed.

Figure 28:
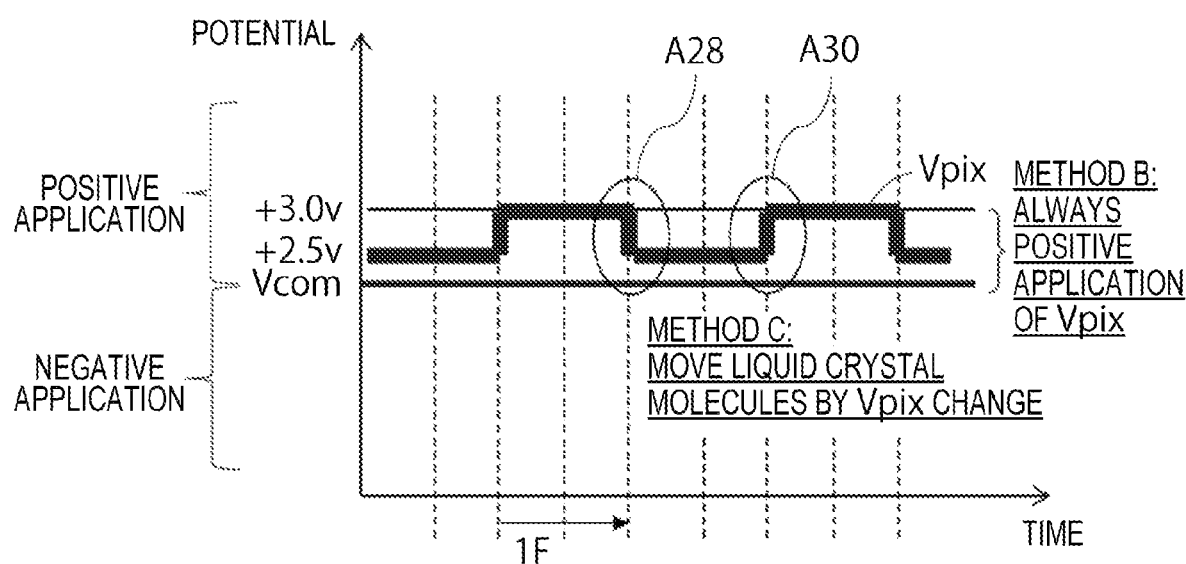
FIG. 28 is a timing chart of relaxation driving in which a bias potential is applied by a pixel signal and the potential fluctuates.

FIG. 28 is a timing chart of the relaxation driving in which the bias potential is applied by the pixel signal Vpix and the potential fluctuates. The horizontal axis represents time, and the vertical axis represents potential. The mode control unit 202 (refer to FIG. 2) causes the gradation processing unit 204 to output the pixel signal Vpix for causing the fluctuation of the bias potential on the positive side at the time of the relaxation driving.

Figure 29:
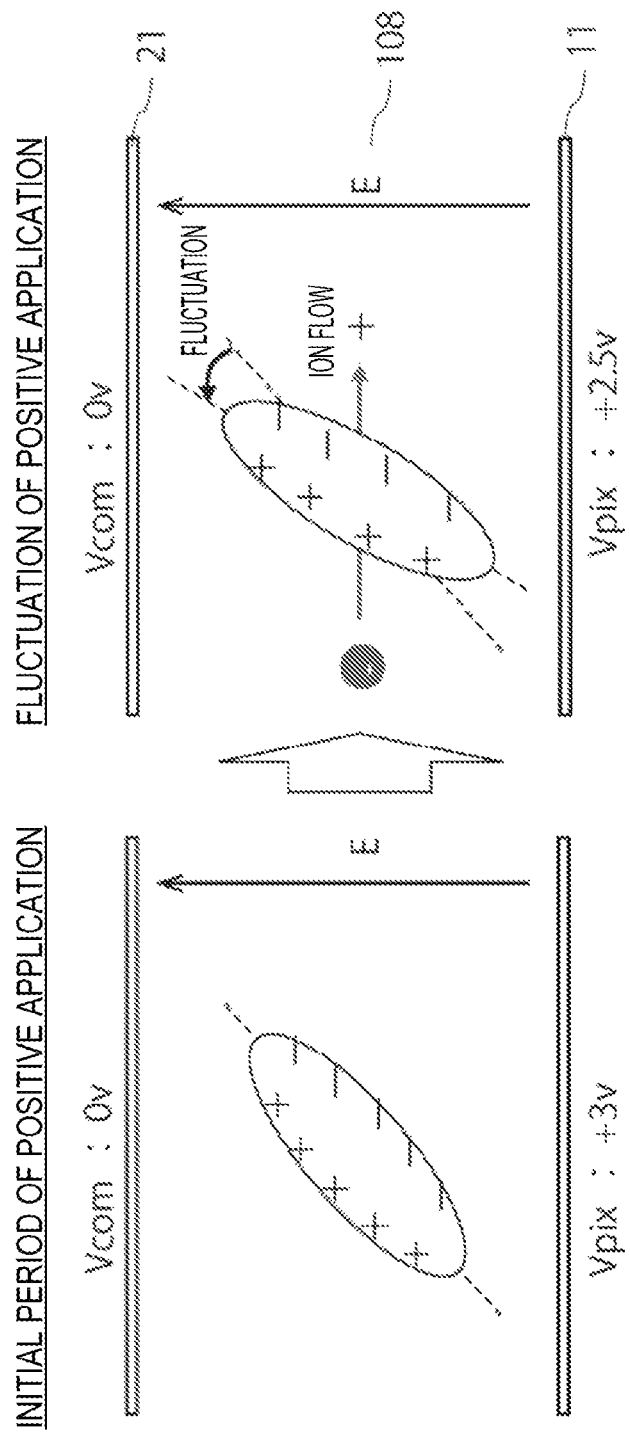
FIG. 29 is a diagram schematically illustrating movement of liquid crystal molecules and a transverse electric field when a pixel signal fluctuates.

FIG. 29 is a diagram schematically illustrating movement of the molecules of the liquid crystal 108 and the transverse electric field when the pixel signal Vpix fluctuates from 3 volts to 2.5 volts. As illustrated in FIG. 29, in an area A28 (refer to FIG. 28), in a case where the pixel signal Vpix fluctuates from 3 volts to 2.5 volts, the liquid crystal molecules rotate to the left at a predetermined angle. As a result, a transverse electric field is generated, and negative impurity ions move to the right side.

FIG. 30 is a diagram schematically illustrating movement of the molecules of the liquid crystal 108 and the transverse electric field when the pixel signal Vpix fluctuates from 2.5 volts to 3 volts. As illustrated in FIG. 30, in an area A30 (refer to FIG. 28), in a case where the pixel signal Vpix fluctuates from 32.5 volts to 3 volts, the molecules rotate to the right at a predetermined angle. As a result, a transverse electric field is generated, and negative impurity ions move to the left side.

Figure 31:
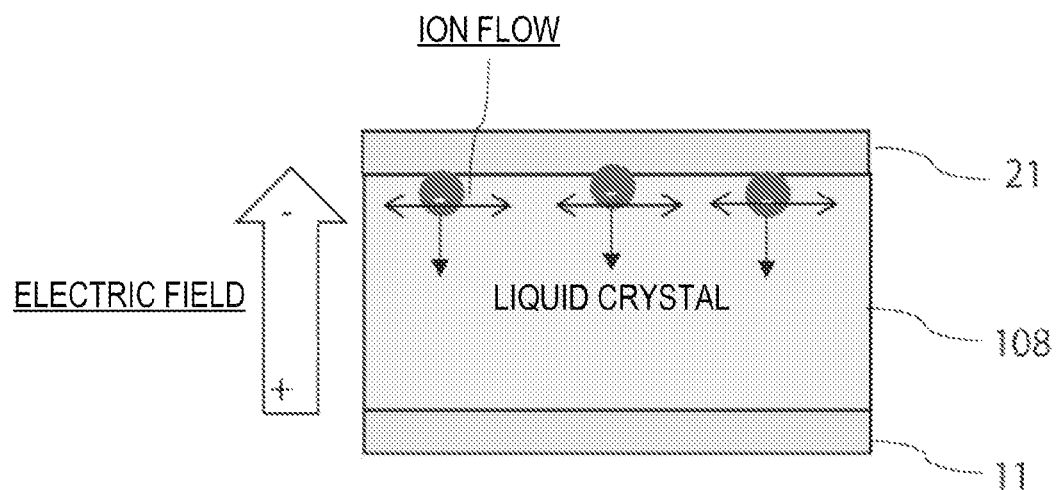
FIG. 31 is a diagram illustrating movement of negative impurity ions in a case where the pixel signal illustrated in FIG. 28 is applied.

FIG. 31 is a diagram illustrating movement of negative impurity ions in a case where the pixel signal Vpix illustrated in FIG. 28 is applied. As illustrated in FIGS. 29 to 31, the impurity ions are vibrated according to the fluctuation of the transverse electric field generated according to the fluctuation cycle of the pixel signal Vpix, and are separated from the counter electrode 21 side to move in the alignment direction by the unidirectional vertical electric field generated by the bias voltage. In this manner, the mode control unit 202 (refer to FIG. 2) controls the gradation conversion unit 204 to maintain the magnitude of the pixel signal Vpix being negative application or positive application, and to periodically change the magnitude of the pixel signal Vpix. Therefore, impurity ions move in a direction away from the pixel electrode 11 or the counter electrode 21 by the unidirectional vertical electric field, and molecules of the liquid crystal 108 are periodically vibrated, so that the transverse electric field also periodically fluctuates. Therefore, the movement amount of impurity ions can be further increased, and the burn-in by the impurity ions can be relaxed more quickly.

Figure 32:
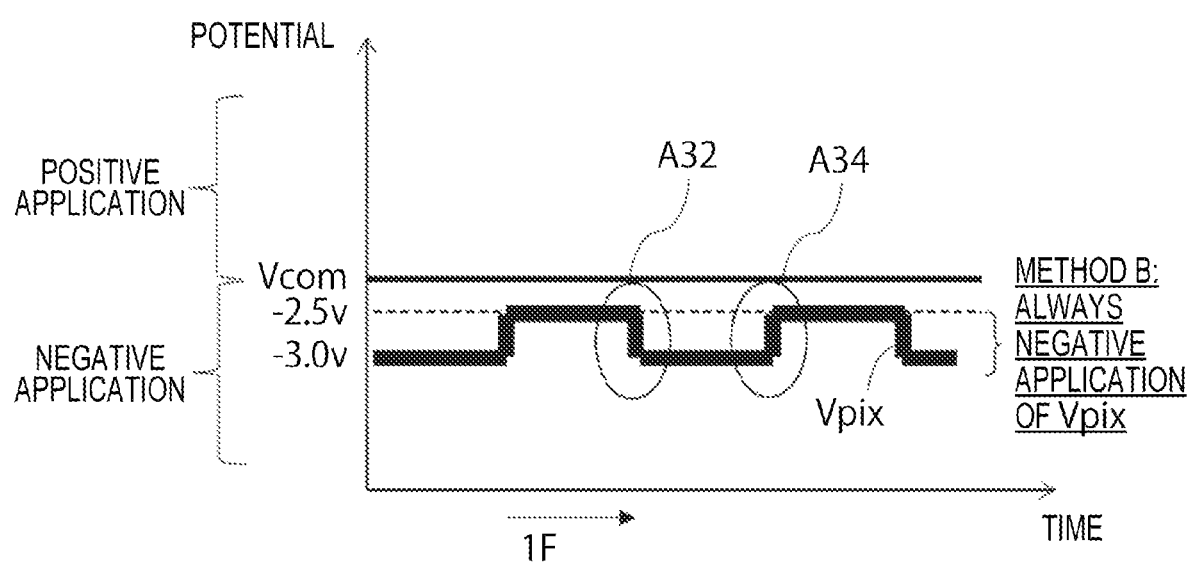
FIG. 32 is a timing chart of relaxation driving in which a negative bias potential is applied and the potential fluctuates.

FIG. 32 is a timing chart of relaxation driving in which a negative bias potential is applied and the potential fluctuates. The horizontal axis represents time, and the vertical axis represents potential. The mode control unit 202 (refer to FIG. 2) causes the gradation processing unit 204 to output the pixel signal Vpix for causing the fluctuation of the bias potential on the negative side at the time of the relaxation driving, according to the control of the timing control unit 200 (refer to FIG. 2).

Figure 33:
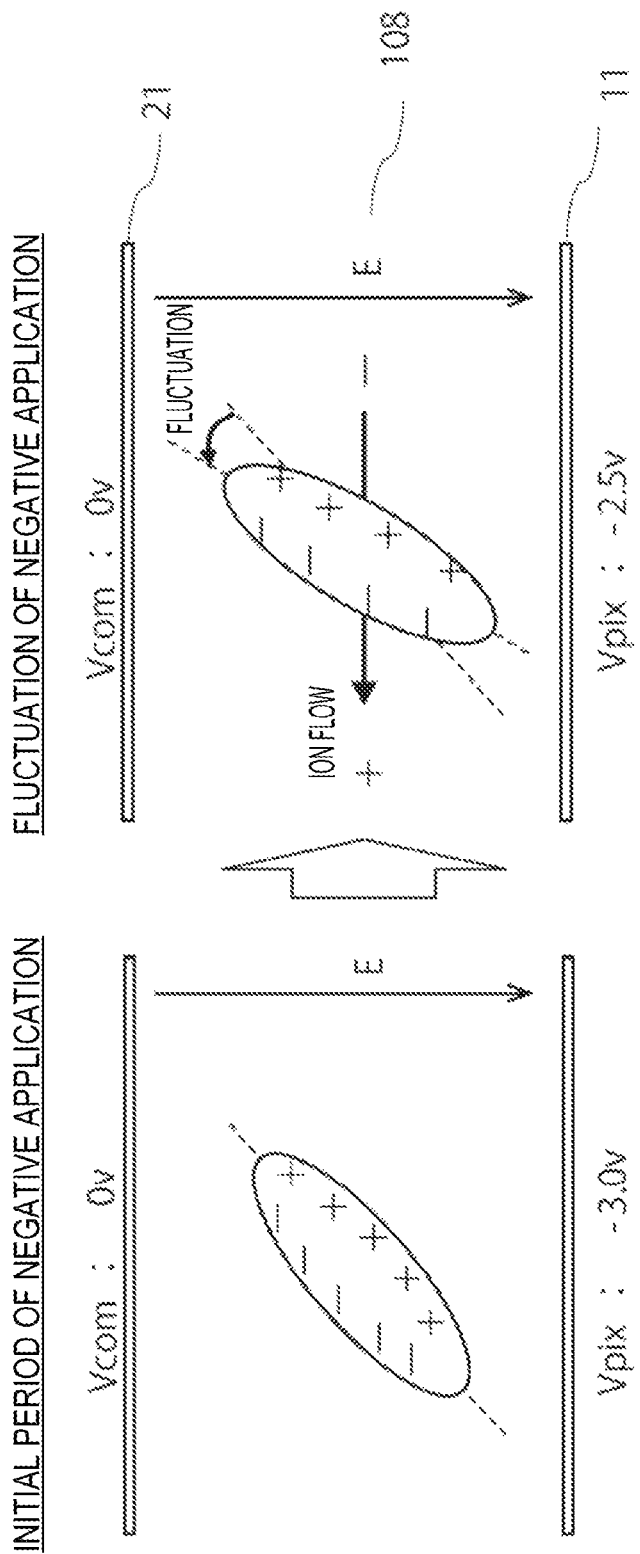
FIG. 33 is a diagram schematically illustrating movement of molecules of a liquid crystal and a transverse electric field when a pixel signal fluctuates from −3 volts to −2.5 volts.

FIG. 33 is a diagram schematically illustrating movement of the molecules of the liquid crystal 108 and the transverse electric field when the pixel signal Vpix fluctuates from −3 volts to −2.5 volts. As illustrated in FIG. 33, in an area A32 (refer to FIG. 32), in a case where the pixel signal Vpix fluctuates from −3 volts to −2.5 volts, the molecules rotate to the left at a predetermined angle. As a result, a transverse electric field is generated, and negative impurity ions move to the right side.

FIG. 34 is a diagram schematically illustrating movement of the molecules of the liquid crystal 108 and the transverse electric field when the pixel signal Vpix fluctuates from −2.5 volts to −3 volts. As illustrated in FIG. 34, in an area A33 (refer to FIG. 32), in a case where the pixel signal Vpix fluctuates from −2.5 volts to −3 volts, the molecules rotate to the right at a predetermined angle. As a result, a transverse electric field is generated, and negative impurity ions move to the left side.

Figure 35:
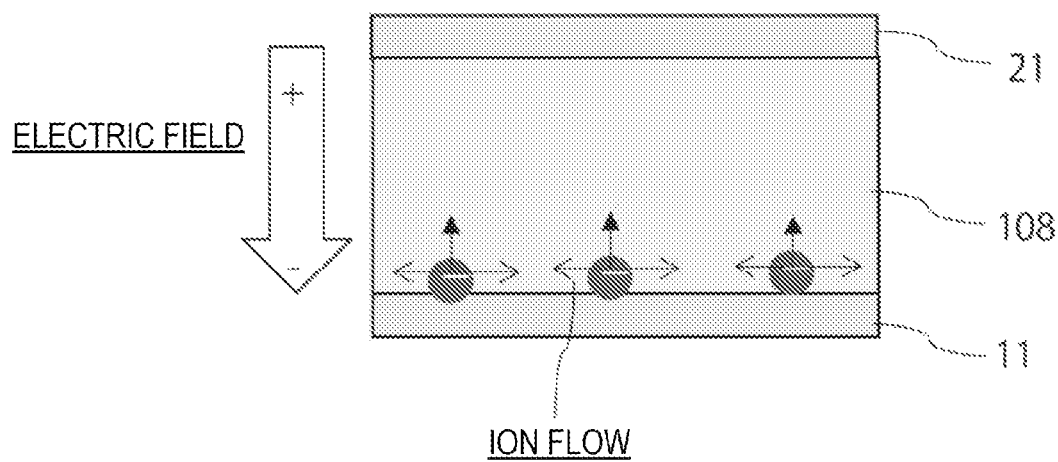
FIG. 35 is a diagram illustrating movement of negative impurity ions in a case where the pixel signal illustrated in FIG. 32 is applied to a negative side.

FIG. 35 is a diagram illustrating movement of negative impurity ions in a case where the pixel signal Vpix illustrated in FIG. 32 is applied to the negative side. As illustrated in FIGS. 23, 24A, 24B, 240, 25, 26, 27, 28, 29, 30, 31, 32, 33, 34, and 35, the impurity ions are vibrated according to the fluctuation of the transverse electric field generated according to the fluctuation cycle of the pixel signal Vpix, and are separated from the pixel electrode 11 side to move in the alignment direction by the unidirectional vertical electric field generated by the bias voltage. In this manner, the mode control unit 202 (refer to FIG. 2) controls the gradation conversion unit 204 to maintain the magnitude of the pixel signal Vpix being negative application or positive application, and to periodically change the magnitude of the pixel signal Vpix. Therefore, impurity ions move in a direction away from the pixel electrode 11 or the counter electrode 21 by the unidirectional vertical electric field, and molecules of the liquid crystal 108 are periodically vibrated. Therefore, the transverse electric field also periodically fluctuates, the movement amount of impurity ions can be further increased, and the burn-in by the impurity ions can be relaxed more quickly.

FIG. 36 is a timing chart of the relaxation driving in the third mode according to the second embodiment. A column A indicates turning-on and turning-off of the backlight 5 (refer to FIG. 1). A column F indicates an example in which the third mode which is the relaxation driving in the second embodiment is set to the turning-off, and a column G indicates an example in which the third mode which is the relaxation driving in the second embodiment is set to the turning-on of the backlight 5 (refer to FIG. 1). A column H indicates an example in which the third mode which is the relaxation driving in the second embodiment is set to both the turning on and the turning-off of the backlight 5 (refer to FIG. 1).

As indicated in the column F, the timing control unit 200 (refer to FIG. 2) supplies a control signal indicating the relaxation mode to the mode control unit 202 (refer to FIG. 2) at the time point when the normal driving of the still image is ended. Therefore, at the time of the turning-off of the backlight 5 (refer to FIG. 1), the mode control unit 202 performs the relaxation driving illustrated in FIGS. 26, 28, and 32, for example. As described above, since the relaxation driving in the third mode is performed after the normal driving is ended, it is possible to perform relaxation in a shorter time even in a case where the burn-in occurs.

Furthermore, as indicated in the column G, the timing control unit 200 (refer to FIG. 2) supplies a control signal indicating the relaxation mode to the mode control unit 202 (refer to FIG. 2) even during the display of the still image. Therefore, even at the time of the turning-on of the backlight 5 (refer to FIG. 1), the mode control unit 202 performs the relaxation driving illustrated in FIGS. 26, 28, and 32, for example. In this case, even in a case where a state in which the pixel signal Vpix is large is continued, the burn-in can be suppressed.

Furthermore, as indicated in the H column, the driving indicated in the F column and the driving indicated in the G column may be performed together. In this case, even in a case where a state in which the pixel signal Vpix is large is continued, the burn-in can be suppressed, and the relaxation driving in the third mode is performed after the normal driving is ended. Therefore, even in a case where the burn-in has not been eliminated in the normal driving, it is possible to perform the relaxation in a shorter time. Furthermore, it is also possible to make the relaxation driving after the normal driving is ended in a shorter time.

As described above, according to the present embodiment, the mode control unit 202 of the control circuit 20 performs the relaxation driving to maintain the magnitude of the pixel signal Vpix being negative application or positive application. Therefore, impurity ions move in a direction away from the pixel electrode 11 or the counter electrode 21 by the unidirectional vertical electric field. Therefore, the impurity ions can be moved in the alignment direction more quickly, and the burn-in by the impurity ions can be relaxed more quickly.

Third Embodiment

The display device 1 according to a third embodiment is different from the display device 1 according to the second embodiment in that the display device 1 according to the third embodiment further has driving for determining the type of trapped impurity ions. Hereinafter, differences from the image display device 1 according to the second embodiment will be described.

Figure 37A:
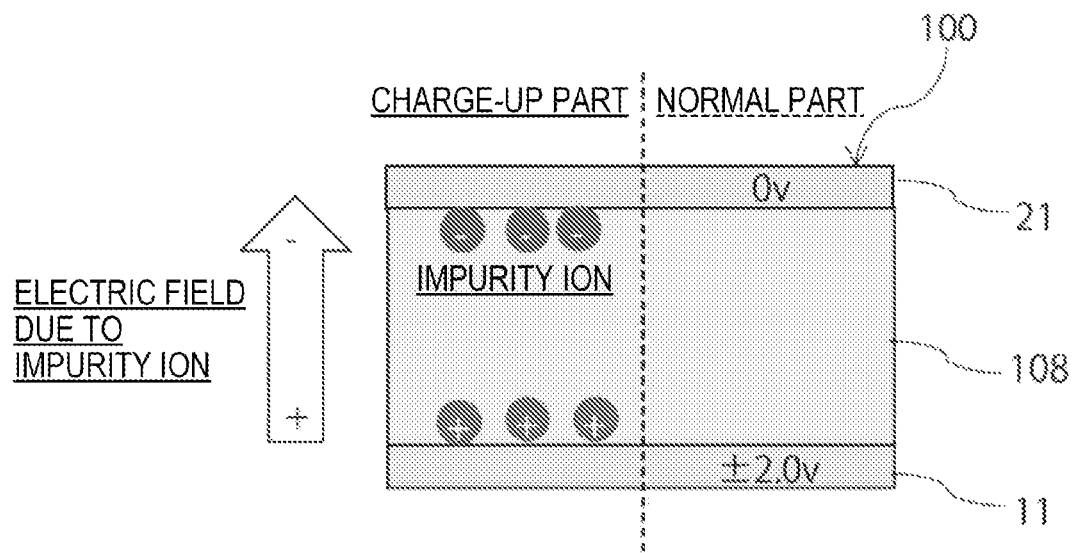
FIG. 37A is a diagram illustrating a pixel in which negative impurity ions are charged up to a counter electrode side and a normal pixel.

FIG. 37A is a diagram illustrating a pixel in which negative impurity ions are charged up to the counter electrode 21 side and a normal pixel. In the pixel that is being charged up, a vertical electric field directed from positive impurity ions to negative impurity ions is generated by the impurity ions.

Figure 37B:
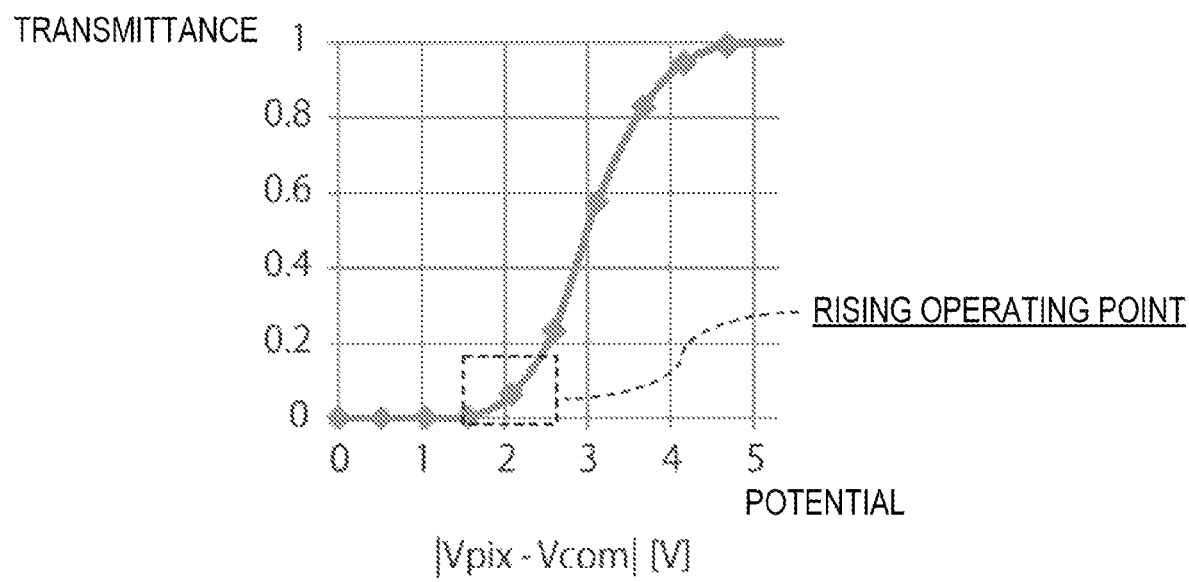
FIG. 37B is a diagram illustrating an example of a gradation curve.

FIG. 37B is a diagram illustrating an example of the gradation curve. The horizontal axis represents the absolute value of the difference between the potential Vpix of the pixel electrode 11 and the common potential Vcom of the counter electrode 21, and the vertical axis represents the transmittance of the liquid crystal 108. In the determination mode, the mode control unit 202 (refer to FIG. 2) causes the gradation conversion unit 204 to apply, for example, an absolute value of 2 volts, which is a rising operating point as illustrated in FIG. 37B, as the pixel signal Vpix and a Vcom potential of 0. For example, an absolute value of 2 volts corresponds to dark gray display.

FIG. 38 is a diagram illustrating an example in which an absolute value of 2 volts is applied as the pixel signal Vpix. The horizontal axis represents time, and the vertical axis represents potential. A driving example of the pixel of the normal part illustrated in FIG. 36 is illustrated, and a driving example of the pixel of the charge-up part is illustrated on the lower side.

In the pixel of the charge-up part, a vertical electric field due to impurity ions is generated as illustrated in FIG. 37A. This vertical electric field has an action equivalent to, for example, lowering the initial common potential Vcom by, for example, 0.2 volts. Therefore, in the pixel of the normal part, the voltages in the positive application and the negative application are +2 volts and −2 volts. On the other hand, since the pixel of the charge-up part is equivalent to a state where the common potential Vcom is lowered by, for example, 0.2 volts, the voltages in the positive application and the negative application are +2.2 volts and −1.8 volts. Therefore, the transmittance of the liquid crystal 108 of the pixel of the charge-up part is increased, and the display image of the liquid crystal 108 of the pixel of the normal part becomes brighter than the display image of the normal part.

Figure 39:
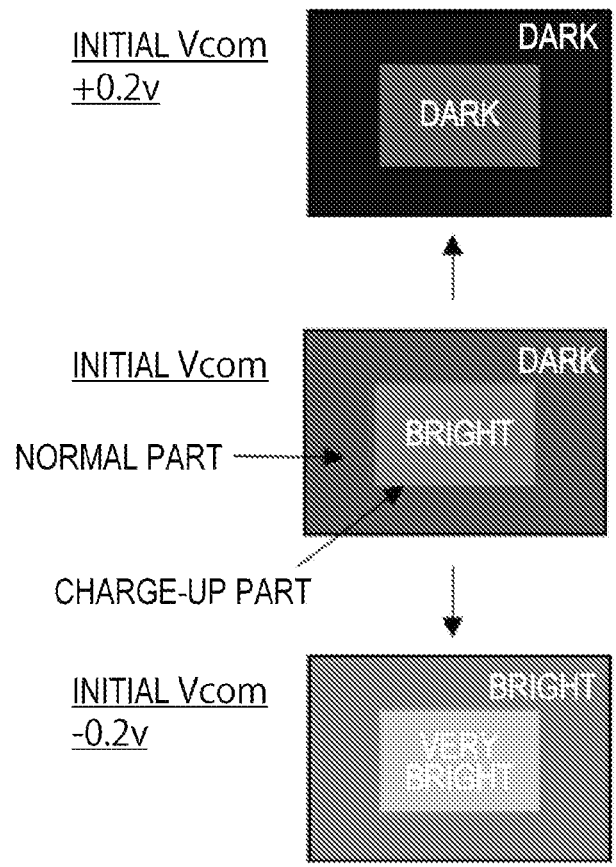
FIG. 39 is a diagram illustrating brightness of a pixel of a normal part and brightness of a pixel of a charge-up part.

FIG. 39 is a diagram illustrating the brightness of the pixel of the normal part and the brightness of the pixel of the charge-up part in the example in which the absolute value of 2 volts is applied as the potential Vpix illustrated in FIG. 38. In an initial state, for example, in a case where the common potential Vcom is 0 volts, the pixel of the charge-up part is brighter than the pixel of the normal part. Next, the mode control unit 202 increases the common potential Vcom to, for example, 0.2 volts. Therefore, the brightness of the pixel of the charge-up part is equivalent to the brightness of the pixel of the normal part in a case where the common potential Vcom is 0 volts. On the other hand, the brightness of the pixel of the normal part has a transmittance of almost zero, and approaches black. Next, the mode control unit 202 lowers the common potential Vcom by, for example, 0.2 volts. Therefore, the brightness of the pixel of the charge-up part becomes brighter. The brightness is equivalent to the brightness of the pixel of the normal part in a case where the common potential Vcom is 0 volts. On the other hand, the brightness of the pixel of the normal part is equivalent to the brightness of the pixel of the charge-up part in a case where the common potential Vcom is 0 volts.

Figure 40:
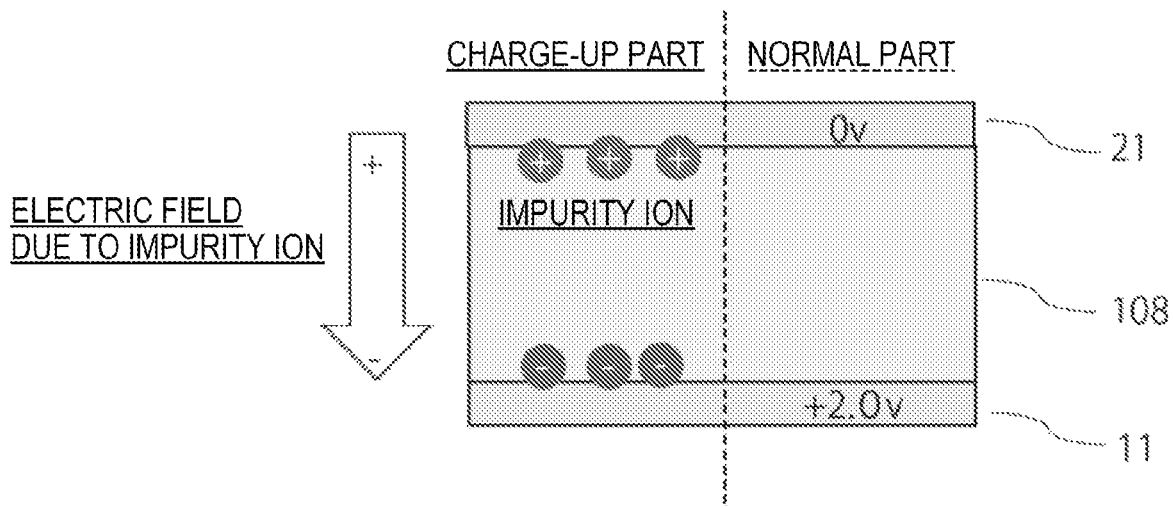
FIG. 40 is a diagram illustrating a pixel in which negative impurity ions are charged up to a pixel electrode side and a normal pixel.

FIG. 40 is a diagram illustrating a pixel in which negative impurity ions are charged up to the pixel electrode 11 side and a normal pixel. In the pixel that is being charged up, a vertical electric field directed from positive impurity ions to negative impurity ions is generated by the impurity ions.

FIG. 41 is a diagram illustrating an example in which an absolute value of 2 volts is applied as the potential Vpix. The horizontal axis represents time, and the vertical axis represents potential. A driving example of the pixel of the normal part illustrated in FIG. 40 is illustrated, and a driving example of the pixel of the charge-up part is illustrated on the lower side. In the pixel of the charge-up part, a vertical electric field due to impurity ions is generated as illustrated in FIG. 40. This vertical electric field has an action equivalent to, for example, increasing the initial common potential Vcom by, for example, 0.2 volts. Therefore, in the pixel of the normal part, the voltages in the positive application and the negative application are +2 volts and −2 volts. On the other hand, since the pixel of the charge-up part is equivalent to a state where the common potential Vcom is increased by, for example, 0.2 volts, the voltages in the positive application and the negative application are +1.8 volts and −2.2 volts. Therefore, the transmittance of the liquid crystal 108 of the pixel of the charge-up part becomes lower than the transmittance of the liquid crystal 108 of the pixel of the normal part, and the pixel becomes darker.

Figure 42:
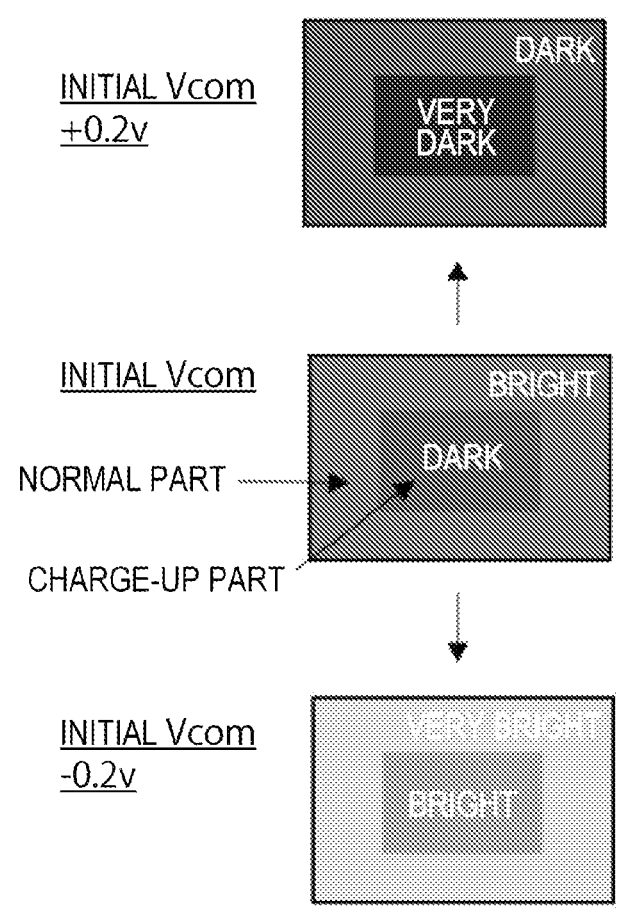
FIG. 42 is a diagram illustrating brightness of a pixel of a normal part and brightness of a pixel of a charge-up part in an example in which an absolute value of 2 volts is applied.

FIG. 42 is a diagram illustrating the brightness of the pixel of the normal part and the brightness of the pixel of the charge-up part in the example in which the absolute value of 2 volts is applied as the potential Vpix. In an initial state, for example, in a case where the common potential Vcom is 0 volts, the pixel of the charge-up part is darker than the pixel of the normal part. Next, the mode control unit 202 lowers the common potential Vcom by, for example, 0.2 volts. Therefore, the brightness of the pixel of the charge-up part is equivalent to the brightness of the pixel of the normal part in a case where the common potential Vcom is 0 volts. On the other hand, the brightness of the pixel of the normal part becomes brighter. Next, the mode control unit 202 increases the common potential Vcom by, for example, 0.2 volts. Therefore, the brightness of the pixel of the charge-up part becomes darker, while the brightness of the pixel of the normal part is equivalent to the brightness of the pixel of the charge-up part in a case where the common potential Vcom is 0 volts.

As described above, in the pixel in which the negative impurity ions are charged up to the pixel electrode 11 side and the pixel in which the negative impurity ions are charged up to the counter electrode 21 side, the brightness and darkness of the pixel of the normal part are opposite. Therefore, this makes it possible to determine whether the negative impurity ions are charged up to the counter electrode 21 side or charged up to the pixel electrode 11 side. Therefore, this makes it possible to determine whether to apply the pixel signal Vpix in the positive application or the negative application in the second embodiment.

As described above, the mode control unit 202 applies the pixel signal Vpix corresponding to the rising portion of the gradation curve to each pixel in the test mode. The pixel in which negative impurity ions are charged up to the counter electrode 21 side is brighter than the pixel of the normal part, and the pixel in which negative impurity ions are charged up to the pixel electrode 11 side is darker than the pixel of the normal part. Therefore, this makes it possible to determine whether the negative impurity ions are charged up to the counter electrode 21 side or charged up to the pixel electrode 11 side.

[Projection-Type Display Device]

Figure 43:
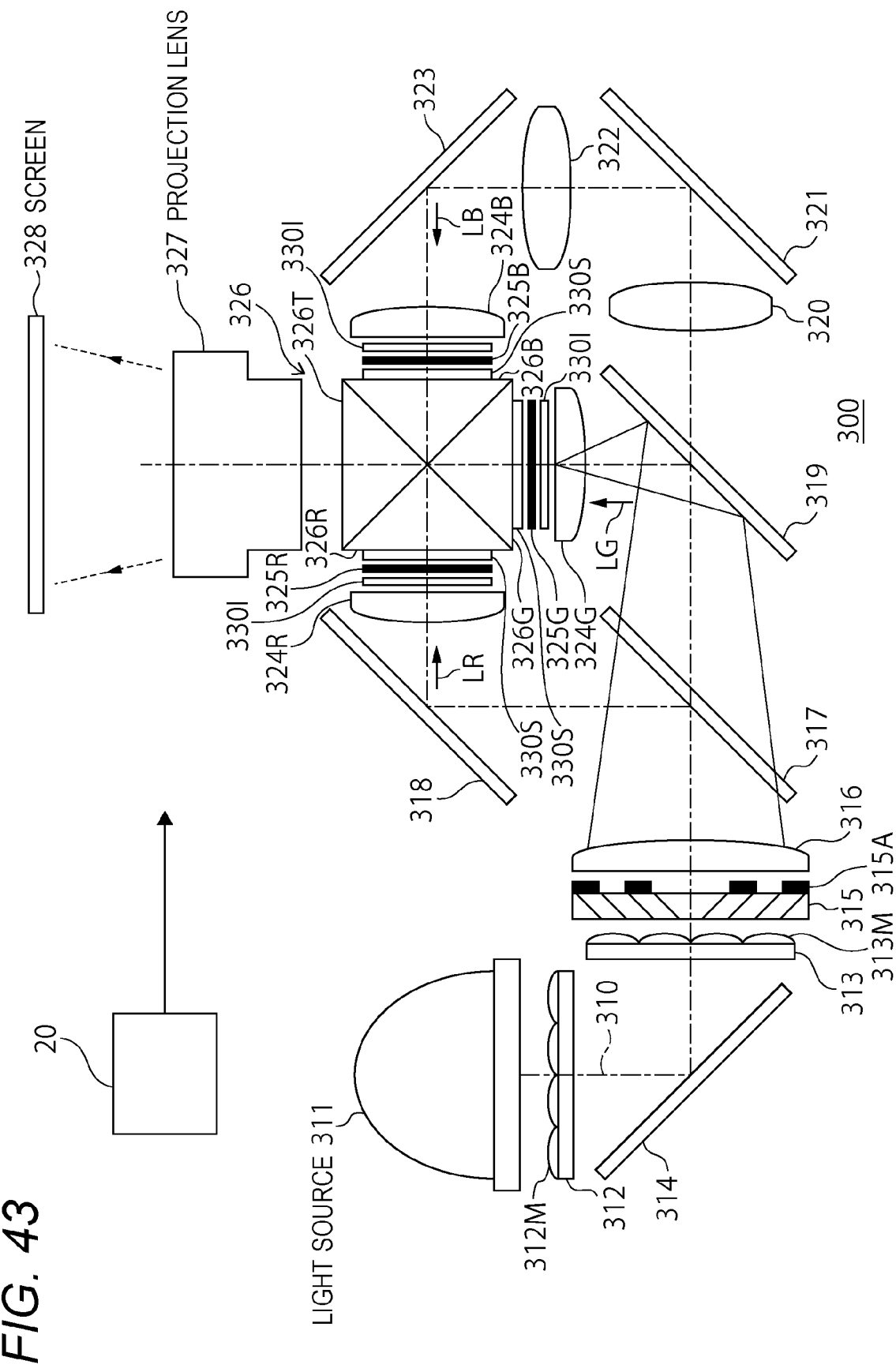
FIG. 43 is a diagram in which a display panel is used in a projection-type liquid crystal projector.

As an example, the liquid crystal display panel 10 as illustrated in FIG. 1 is used for a projection-type liquid crystal projector as illustrated in FIG. 43.

A liquid crystal projector 300 illustrated in FIG. 43 is a so-called three-plate projector that separates light from a light source into three primary colors of red, blue, and green, and performs color image display using one liquid crystal display panel for each color. Hereinafter, for convenience, the liquid crystal display panel 10 on which red light is incident is referred to as a liquid crystal display device 325R, the liquid crystal display panel 10 on which green light is incident is referred to as a liquid crystal display device 325G, and the liquid crystal display panel 10 on which blue light is incident is referred to as a liquid crystal display device 325B. The liquid crystal display devices 325R, 325G, and 325B correspond to the liquid crystal display panel 10 illustrated in FIG. 1, and the three plates have substantially the same structure. The liquid crystal display devices 325R, 325G, and 325B are controlled by the control circuit 20.

The liquid crystal projector 300 in FIG. 43 includes a light source 311 that emits light, a first lens array 312 arranged on an emission side of the light from the light source 311, a mirror 314 that reflects the emitted light from the first lens array 312 and changes an optical path (optical axis 310) of the emitted light by 90°, and a second lens array 313 on which the reflected light from the mirror 314 is incident.

The mirror 314 is preferably a total reflection mirror.

A plurality of microlenses 312M is two-dimensionally arranged in the first lens array 312, and a plurality of microlenses 313M is two-dimensionally arranged in the second lens array 313. The first lens array 312 and the second lens array 313 are for uniformizing illuminance distribution of light, and have a function of dividing the incident light into a plurality of small light fluxes.

Note that an Ultraviolet (UV)/Infrared (IR) cut filter (not illustrated) may be installed between the light source 311 and the first lens array 312.

The light source 311 emits white light including red light, blue light, and green light required for color image display. The light source 311 includes a light emitter (not illustrated) that emits white light, and a reflector that reflects and collects light emitted from the light emitter.

As the light emitter, for example, a lamp such as an ultra-high pressure mercury lamp, a halogen lamp, a metal halide lamp, or a xenon lamp is used. The reflector desirably has a shape with good light collection efficiency, and has a rotationally symmetric concave surface shape such as a spheroidal mirror or a paraboloid of revolution. Furthermore, the light emission point of the light emitter is disposed at the focal position of the reflector having a concave surface shape.

The white light emitted from the light emitter of the light source 311 becomes substantially parallel light by the reflector, passes through the first lens array 312, and enters the total reflection mirror 314. The white light of which the optical axis 310 is bent by 90° by the total reflection mirror 314 is incident on the second lens array 313.

The liquid crystal projector 300 illustrated in FIG. 43 includes a PS composite element 315, a condenser lens 316, and a dichroic mirror 317 on the emission side of the light from the second lens array 313.

The PS composite element 315 is provided with a plurality of retardation plates 315A at positions corresponding to portions between adjacent microlenses in the second lens array 313. The half-wave plate is an example of retardation plate 315A.

The PS composite element 315 separates the incident light into polarized light of P polarization components and polarized light of S polarization components. Furthermore, the PS composite element 315 emits one polarized light of the two separated beams of polarized light from the polarization conversion element 315 while maintaining the polarization direction (for example, P polarized light), and converts the other polarized light (for example, S polarization component) into another polarization component (for example, P polarization component) by the action of the half-wave plate 315A to emit the resultant polarization component.

The light emitted from the PS composite element 315 is condensed by the condenser lens 316, and enters the dichroic mirror 317.

The dichroic mirror 317 reflects, for example, red light LR among the incident light beams, and transmits light of other colors, thereby color-separating the incident light into red light LR and other colors.

Moreover, the liquid crystal projector 300 includes a mirror 318, a field lens 324R, an incident-side polarizing plate 330I, the liquid crystal display device 325R, and an emission-side polarizing plate 330S along the optical path of the red light LR color-separated by the dichroic mirror 317.

As the mirror 318, a total reflection mirror is preferably used. The total reflection mirror 318 reflects the red light LR color-separated by the dichroic mirror 317 toward the incident-side polarizing plate 330I and the liquid crystal display device 325R.

As described above, the incident-side polarizing plate 330I allows, among the red light LR incident from the total reflection mirror 318, the light in a direction coinciding with a polarization axis 330a to pass therethrough.

The liquid crystal display device 325R spatially modulates the red light LR incident through the incident-side polarizing plate 330I according to input image data. The emission-side polarizing plate 330S allows, among the modulated red light LR from the liquid crystal display panel 325R, the light in a direction coinciding with a polarization axis 330b to pass therethrough.

The liquid crystal projector 300 includes a dichroic mirror 319 along an optical path of light of another color, which is color-separated by the dichroic mirror 317. The dichroic mirror 319 color-separates the incident light into green light LG and blue light LB by reflecting, for example, the green light LG and transmitting the blue light LB among the incident light.

A field lens 324G, the incident-side polarizing plate 330I, the liquid crystal display panel 325G, and the emission-side polarizing plate 330S are provided on the optical path of the green light LG color-separated by the dichroic mirror 319.

As described above, the incident-side polarizing plate 330I allows, among the green light LG incident from the dichroic mirror 319, the light in a direction coinciding with the polarization axis 330a to pass therethrough.

The liquid crystal display device 325G spatially modulates the green light LG incident through the incident-side polarizing plate 330I according to input image data.

The emission-side polarizing plate 330S allows, among the modulated green light LG from the liquid crystal display panel 325G, the light in a direction coinciding with the polarization axis 330b to pass therethrough.

Moreover, a relay lens 320, a mirror 321, a relay lens 322, a mirror 323, a field lens 324B, the incident-side polarizing plate 330I, the liquid crystal display device 325B, and the emission-side polarizing plate 330S are provided along the optical path of the blue light LB color-separated by the dichroic mirror 319.

The mirrors 321 and 323 are preferably total reflection mirrors. The total reflection mirror 321 reflects the blue light LB incident through the relay lens 320 toward the total reflection mirror 323. The total reflection mirror 323 reflects the blue light LB, which is reflected by the total reflection mirror 321 and is incident through the relay lens 322, toward the incident-side polarizing plate 330I and the liquid crystal display panel 325B.

As described above, the incident-side polarizing plate 330I allows, among the green light LG incident from the total reflection mirror 323, the light in a direction coinciding with the polarization axis 330a to pass therethrough.

The liquid crystal display device 325B spatially modulates the blue light LB, which is reflected by the total reflection mirror 323 and is incident through the field lens 324B and the incident-side polarizing plate 330I, according to input image data.

The emission-side polarizing plate 330S allows, among the modulated blue light LB from the liquid crystal display panel 325B, the light in a direction coinciding with the polarization axis 330b to pass therethrough. At a position where the optical paths of the red light LR, the green light LG, and the blue light LB intersect, a cross prism 326 having a function of combining light of these three colors is installed.

As an example, the cross prism 326 is formed by joining four right angle prisms each having incident surfaces 326R, 326G, and 326B on which the red light LR, the green light LG, and the blue light LB are respectively incident, and an emission surface 326T from which light obtained by combining the red light LR, the green light LG, and the blue light LB is emitted.

In the liquid crystal projector 300, a dichroic film is coated on the joint surface of each right angle prism such that the green light LG incident on the cross prism 326 is transmitted toward the emission surface 326T side, and the red light LR and the blue light LB incident on the cross prism 326 are reflected toward the emission surface 326T side.

As described above, the cross prism 326 combines the light of three colors incident on the incident surfaces 326R, 326G, and 326B and emits the combined light from the emission surface 326T.

Furthermore, the liquid crystal projector 300 also includes a projection lens 327 for projecting the combined light emitted from the cross prism 326, toward a screen 328. The projection lens 327 preferably includes a plurality of lenses, and has a zoom function and a focus function for adjusting the size of an image to be projected on the screen 328.

Note that the above-described effects can be obtained even in a case where the present invention is applied to not only the projection-type liquid crystal display element but also any type of devices such as a reflection-type liquid crystal display element and LCOS.

Furthermore, the above-described effects can be expected even in a case where the present invention is applied to any type of liquid crystal display elements such as a driving built-in liquid crystal display element, a liquid crystal display element with a drive circuit externally attached thereto, a liquid crystal display element with various sizes of a diagonal of about 1 inch to 15 inches or more, a simple matrix type, a TFD active matrix type, a passive matrix drive type, a polarization mode, and a birefringence mode.

Note that the present technology can have the following configurations.

(1) A drive circuit of a display panel having a liquid crystal layer of which molecular characteristics are changed according to a potential difference between a first electrode and a second electrode, the drive circuit including:
a signal processing unit that outputs a first signal for changing the potential difference according to an input pixel signal; and
a control unit that causes the signal processing unit to output, as a second signal, at least one of a signal for changing the potential difference at a predetermined cycle or a signal for maintaining the potential difference in one direction of reducing ions staying between the first electrode and the second electrode, for a predetermined time.

(2) The drive circuit of the display panel described in (1), in which the control unit performs control to cause the signal processing unit to output the second signal in a predetermined period after the first signal is output.

(3) The drive circuit of the display panel described in (2), in which the control unit performs control to cause the signal processing unit to output the second signal which periodically generates a predetermined first potential difference and a second potential difference different from the first potential difference.

(4) The drive circuit of the display panel described in (1), in which the signal processing unit includes
a first gradation conversion unit that converts the input pixel signal into the first signal on the basis of a first gradation characteristic, and
a second gradation conversion unit that converts the input pixel signal into the first signal on the basis of a second gradation characteristic different from the first gradation characteristic, and
the control unit alternately changes the first signal based on the first gradation characteristic and the first signal based on the second gradation characteristic at the predetermined cycle, and outputs the signal as the second signal.

(5) The drive circuit of the display panel described in (4), in which the signal processing unit further includes a third gradation conversion unit that converts the input pixel signal into the first signal on the basis of a third gradation characteristic different from the first gradation characteristic and the second gradation characteristic, and
a transmittance of the liquid crystal layer according to the first signal based on the third gradation characteristic is between a transmittance of the liquid crystal layer according to the first signal based on the first gradation characteristic and a transmittance of the liquid crystal layer according to the first signal based on the second gradation characteristic.

(6) The drive circuit of the display panel described in (5), in which the control unit is configured to
cause the signal processing unit to output the first signal based on the third gradation characteristic in a first mode, and
alternately change the first signal based on the first gradation characteristic and the first signal based on the second gradation characteristic at the predetermined cycle, and output the signal as the second signal in a second mode.

(7) The drive circuit of the display panel described in (1), in which the control unit causes the signal processing unit to output the second signal in a turning-off period of light emitted to the liquid crystal layer.

(8) The drive circuit of the display panel described in (1), in which the control unit alternately outputs the first signal and the second signal in a turning-on period of light emitted to the liquid crystal layer.

(9) The drive circuit of the display panel described in any one of (1) to (6), in which the display panel has a plurality of pixels having a liquid crystal layer of which molecular characteristics are changed according to the potential difference between the first electrode and the second electrode.

(10) The drive circuit of the display panel described in (9), in which the second electrodes are formed as common electrode connected to each other, and
the potential difference is different between the pixels.

(11) The drive circuit of the display panel described in (7), in which the control unit causes the signal processing unit to output the second signal such that the potential difference applied between adjacent pixels is different, and is periodically switched.

(12) The drive circuit of the display panel described in (1), in which the control unit causes the signal processing unit to output the second signal that generates a unidirectional electric field in the liquid crystal layer for a predetermined period.

(13) The drive circuit of the display panel described in (12),
in which the control unit changes alignment of the electric field according to electrical properties of ions staying at the first electrode.

(14) A display device including:
the drive circuit of the display panel described in any one of (1) to (13);
a light source;
a first polarizing plate that firstly polarizes emitted light to irradiate the display panel with the light; and
a second polarizing plate that secondly polarizes the light emitted from the display panel.

(15) A liquid crystal projector including:
the drive circuit of the display panel described in any one of (1) to (13);
a light source;
a condensing optical system that guides light emitted from the light source to the display panel; and
a projection optical system that magnifies and projects the light modulated by the display panel.

(16) A drive method of a display panel having a liquid crystal layer of which molecular characteristics are changed according to a potential difference between a first electrode and a second electrode, the drive method including:
a first output step of outputting a first signal for changing the potential difference according to an input pixel signal; and
a second output step of outputting, as a second signal, at least one of a signal for changing the potential difference at a predetermined cycle or a signal for maintaining the potential difference in a direction of reducing ions staying between the first electrode and the second electrode, for a predetermined time.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Display device
5 Backlight
8 Polarizing plate
10 Liquid crystal display panel
11 Pixel electrode
15 Front cover
20 Drive circuit
21 Common electrode
100 Pixel
202 Mode control unit
204 Gradation conversion unit
204a First gradation conversion unit
204b Second gradation conversion unit
204c Third gradation conversion unit

The invention claimed is:

1. A drive circuit comprising:
in a display panel having a liquid crystal layer, wherein molecular characteristics of the liquid crystal layer are changed based a potential difference between a first electrode and a second electrode:
a signal processing unit configured to output a first signal to change the potential difference based on an input pixel signal; and
a control unit configured to control the signal processing unit to:
output, as a second signal, at least one of
a signal to change the potential difference at a specific cycle, or
a signal to maintain the potential difference in a direction of reducing ions staying between the first electrode and the second electrode, for a specific time; and
alternately output the first signal and the second signal in a turning-on period of light emitted to the liquid crystal layer.

2. The drive circuit of the display panel according to claim 1, wherein the control unit is further configured to control the signal processing unit to output the second signal in a specific period after the output of the first signal.

3. The drive circuit of the display panel according to claim 2, wherein the control unit is further configured to control the signal processing unit to output the second signal which periodically generates a first potential difference and a second potential difference different from the first potential difference.

4. The drive circuit of the display panel according to claim 1, wherein
the signal processing unit includes:
a first gradation conversion unit configured to convert the input pixel signal into the first signal based on a first gradation characteristic; and
a second gradation conversion unit configured to convert the input pixel signal into the first signal based on a second gradation characteristic different from the first gradation characteristic, and the control unit is further configured to:
control the signal processing unit to alternately change the first signal based on the first gradation characteristic and the first signal based on the second gradation characteristic at the specific cycle; and
output the changed first signal as the second signal.

5. The drive circuit of the display panel according to claim 4, wherein
the signal processing unit further includes a third gradation conversion unit configured to convert the input pixel signal into the first signal based on a third gradation characteristic different from the first gradation characteristic and the second gradation characteristic, and
a first transmittance of the liquid crystal layer according to the first signal based on the third gradation characteristic is between a second transmittance of the liquid crystal layer according to the first signal based on the first gradation characteristic and a third transmittance of the liquid crystal layer according to the first signal based on the second gradation characteristic.

6. The drive circuit of the display panel according to claim 5, wherein the control unit is further configured to control the signal processing unit to:
output the first signal based on the third gradation characteristic in a first mode;
alternately change the first signal based on the first gradation characteristic and the first signal based on the second gradation characteristic at the specific cycle; and
output the changed first signal as the second signal in a second mode.

7. The drive circuit of the display panel according to claim 1, wherein the control unit is further configured to control the signal processing unit to output the second signal in a turning-off period of the light emitted to the liquid crystal layer.

8. The drive circuit of the display panel according to claim 1, wherein the display panel has a plurality of pixels having the liquid crystal layer of which the molecular characteristics are changed based on the potential difference between the first electrode and the second electrode.

9. The drive circuit of the display panel according to claim 8, wherein
a plurality of second electrodes are connected as common electrode, and
the potential difference is different between the plurality of pixels.

10. The drive circuit of the display panel according to claim 7, wherein the control unit is further configured to control the signal processing unit to output the second signal, such that the potential difference between adjacent pixels is different and the potential difference is periodically switched.

11. The drive circuit of the display panel according to claim 1, wherein the control unit is further configured to control the signal processing unit to output the second signal that generates a unidirectional electric field in the liquid crystal layer for a specific period.

12. The drive circuit of the display panel according to claim 11, wherein the control unit is further configured to change alignment of an electric field based on electrical properties of ions that stays at the first electrode.

13. A display device, comprising:
the drive circuit of the display panel according to claim 1;

a light source configured to emit the light;
a first polarizing plate configured to firstly polarize the emitted light to irradiate the display panel with the light; and
a second polarizing plate configured to secondly polarize light emitted from the display panel.

14. A liquid crystal projector, comprising:
the drive circuit of the display panel according to claim 1;
a light source configured to emit the light;
a condensing optical system configured to guide the light emitted from the light source to the display panel; and
a projection optical system configured to magnify and project light modulated by the display panel.

15. A drive method, comprising:
in a display panel having a liquid crystal layer, wherein molecular characteristics of the liquid crystal layer are changed based a potential difference between a first electrode and a second electrode:
outputting a first signal for changing the potential difference based on an input pixel signal;
outputting, as a second signal, at least one of
   a signal for changing the potential difference at a predetermined specific cycle, or
   a signal for maintaining the potential difference in a direction of reducing ions staying between the first electrode and the second electrode, for a specific time; and
alternately outputting the first signal and the second signal in a turning-on period of light emitted to the liquid crystal layer.

* * * * *